US012638837B2

(12) United States Patent

Ponnada et al.

(10) Patent No.: US 12,638,837 B2

(45) Date of Patent: May 26, 2026

(54) SYSTEMS, AND METHODS FOR DIAGNOSING AN ADDITIVE MANUFACTURING DEVICE USING A PHYSICS ASSISTED MACHINE LEARNING MODEL

(71) Applicant: General Electric Company, Schenectady, NY (US)

(72) Inventors: V S S Srivatsa Ponnada, Bengaluru (IN); Venkata Dharma Surya Narayana Sastry Rachakonda, Bengaluru (IN); Megha Navalgund, Bengaluru (IN); Pär Christoffer Arumskog, Molnlycke (SE); Mattias Fager, Molnlycke (SE)

(73) Assignee: General Electric Company, Evendale, NY (US)

( * ) Notice: Subject to any disclaimer, the term of this patent is extended or adjusted under 35 U.S.C. 154(b) by 0 days.

(21) Appl. No.: 18/426,024

(22) Filed: Jan. 29, 2024

(65) Prior Publication Data

US 2024/0210930 A1     Jun. 27, 2024

Related U.S. Application Data

(63) Continuation of application No. 17/991,462, filed on Nov. 21, 2022, now Pat. No. 11,906,955, which is a (Continued)

(51) Int. Cl.
| | |
|---|---|
| *G05B 23/02* | (2006.01) |
| *G05B 19/4099* | (2006.01) |

(52) U.S. Cl.
CPC ..... *G05B 23/0208* (2013.01); *G05B 19/4099* (2013.01); *G05B 2219/49007* (2013.01); *G05B 2223/06* (2018.08)

(58) Field of Classification Search
None
See application file for complete search history.

(56) References Cited

U.S. PATENT DOCUMENTS

| | | | |
|---|---|---|---|
| 4,852,018 | A | 7/1989 | Grossberg et al. |
| 7,493,185 | B2 | 2/2009 | Cheng et al. |

(Continued)

FOREIGN PATENT DOCUMENTS

| | | |
|---|---|---|
| CN | 107199397 A | 9/2017 |
| CN | 110046716 A | 7/2019 |

(Continued)

OTHER PUBLICATIONS

Rao, Prahalad K., et al. "Online real-time quality monitoring in additive manufacturing processes using heterogeneous sensors." Journal of Manufacturing Science and Engineering 137.6 (2015): 061007. (Year: 2015).*

(Continued)

*Primary Examiner* — Carlos R Ortiz Rodriguez
(74) *Attorney, Agent, or Firm* — Hanley, Flight & Zimmerman, LLC

(57) ABSTRACT

A system for diagnosing an additive manufacturing device is provided. The system includes a first module configured to: obtain one or more parameters for a digital twin of a component of the additive manufacturing device based on raw data from the component of the additive manufacturing device; and generate physics features for the digital twin of the component of the additive manufacturing device based on the one or more parameters and one or more transfer functions, a second module configured to obtain one or more classifiers for classifying the component as a first condition or a second condition based on physics features; and a third module configured to: determine a health of the component (Continued)

based on the generated physics features of the first model and the one or more classifiers.

20 Claims, 11 Drawing Sheets

Related U.S. Application Data continuation of application No. 17/386,396, filed on Jul. 27, 2021, now Pat. No. 11,507,072.

(60) Provisional application No. 63/057,554, filed on Jul. 28, 2020.

(56)                   References Cited

U.S. PATENT DOCUMENTS

| | | | |
|---|---|---|---|
| 7,635,825 | B2 | 12/2009 | Larsson |
| 9,908,289 | B2 | 3/2018 | Roscoe |
| 9,999,924 | B2 * | 6/2018 | Dave ....................... B22F 10/38 |
| 10,220,566 | B2 | 3/2019 | Bauza et al. |
| 11,507,072 | B2 | 11/2022 | Ponnada et al. |
| 11,906,955 | B2 | 2/2024 | Ponnada et al. |
| 2009/0206804 | A1 | 8/2009 | Xu et al. |
| 2009/0306804 | A1 | 12/2009 | Chao et al. |
| 2017/0270434 | A1 | 9/2017 | Takigawa et al. |
| 2017/0368754 | A1 | 12/2017 | Fruth et al. |
| 2018/0137219 | A1 | 5/2018 | Goldfarb et al. |
| 2019/0005200 | A1 | 1/2019 | Zimmerman et al. |
| 2019/0049929 | A1 * | 2/2019 | Good ................... B23K 26/342 |
| 2019/0090840 | A1 | 3/2019 | Nagesh |
| 2019/0147412 | A1 | 5/2019 | Chiaramonte et al. |
| 2019/0184631 | A1 | 6/2019 | Bauza et al. |
| 2019/0384255 | A1 * | 12/2019 | Krishnaswamy .... G05B 23/024 |
| 2020/0194225 | A1 | 6/2020 | Cui |

FOREIGN PATENT DOCUMENTS

| | | |
|---|---|---|
| CN | 110832614 A | 2/2020 |
| CN | 111063026 A | 4/2020 |
| WO | 2018216845 A1 | 11/2018 |

OTHER PUBLICATIONS

Aminzadeh, Masoumeh. "A machine vision system for in-situ quality inspection in metal powder-bed additive manufacturing." (2016). (Year: 2016).*

Samie Tootooni, M., et al. "Classifying the dimensional variation in additive manufactured parts from laser-scanned three-dimensional point cloud data using machine learning approaches." Journal of Manufacturing Science and Engineering 139.9 (2017): 091005. (Year: 2017).*

Baturynska, Ivanna, Oleksandr Semeniuta, and Kristian Martinsen. "Optimization of process parameters for powder bed fusion additive manufacturing by combination of machine learning and finite element method: A conceptual framework." Procedia Cirp 67 (2018): 227-232. (Year: 2018).*

Amini, Mohammadhossein, and Shing Chang. "Process monitoring of 3D metal printing in Industrial Scale." International Manufacturing Science and Engineering Conference. vol. 51357. American Society of Mechanical Engineers, 2018. (Year: 2018).*

Khanzadeh, Mojtaba, et al. "Quantifying geometric accuracy with unsupervised machine learning: Using self-organizing map on fused filament fabrication additive manufacturing parts." Journal of Manufacturing Science and Engineering 140.3 (2018): 031011. (Year: 2018).*

Du Plessis, Anton, et al. "X-ray microcomputed tomography in additive manufacturing: a review of the current technology and applications." 3D Printing and Additive Manufacturing 5.3 (2018): 227-247. (Year: 2018).*

Hanses, Jonathan, and Morten Eriksson. "Modelling and Control of Heat Distribution in a Powder Bed Fusion 3D Printer." (2019). (Year: 2019).*

Han, Feng, et al. "Image classification and analysis during the additive manufacturing process based on deep convolutional neural networks." 2019 20th International Conference on Electronic Packaging Technology (ICEPT). IEEE, 2019. (Year: 2019).*

Seifi, Seyyed Hadi, et al. "Layer-wise modeling and anomaly detection for laser-based additive manufacturing." Journal of Manufacturing Science and Engineering 141.8 (2019): 081013. (Year: 2019).*

García-Moreno, Angel-Iván. "Automatic quantification of porosity using an intelligent classifier." The International Journal of Advanced Manufacturing Technology 105 (2019): 1883-1899. (Year: 2019).*

Joshi, M. S., et al. "Applications of supervised machine learning algorithms in additive manufacturing: A review." (2019): 213. (Year: 2019).*

Li, Zhixiong, et al. "Prediction of surface roughness in extrusion-based additive manufacturing with machine learning." Robotics and Computer-Integrated Manufacturing 57 (2019): 488-495. (Year: 2019).*

Xiong, Yi, et al. "Data-driven design space exploration and exploitation for design for additive manufacturing." Journal of Mechanical Design 141.10 (2019): 101101. (Year: 2019).*

Nagarajan, Hari PN, et al. "Knowledge-based design of artificial neural network topology for additive manufacturing process modeling: A new approach and case study for fused deposition modeling." Journal of Mechanical Design 141.2 (2019): 021705. (Year: 2019).*

Aminzadeh, Masoumeh, and Thomas R. Kurfess. "Online quality inspection using Bayesian classification in powder-bed additive manufacturing from high-resolution visual camera images." Journal of Intelligent Manufacturing 30 (2019): 2505-2523. (Year: 2019).*

Liu, Chenang. "Smart additive manufacturing using advanced data analytics and closed loop control." (2019). (Year: 2019).*

Rao, Prahalad K., et al. "Sensor-based online process fault detection in additive manufacturing." International Manufacturing Science and Engineering Conference. vol. 56833. American Society of Mechanical Engineers, 2015. (Year: 2015).*

Wu, Haixi, Zhonghua Yu, and Yan Wang. "Real-time FDM machine condition monitoring and diagnosis based on acoustic emission and hidden semi-Markov model." The International Journal of Advanced Manufacturing Technology 90.5 (2017): 2027-2036. (Year: 2017).*

European Patent Office, "Extended European Search Report," issued in connection with European Patent Appl. No. 21187882.2, dated Jan. 4, 2022, 10 pages.

European Patent Office, "Communication Pursuant to Article 94(3) EPC", issued in connection with European Patent Application No. 21187882.2-1201, dated Jul. 26, 2023, 9 pages.

The State Intellectual Property Office of People's Republic of China, "First Office Action and First Search," mailed in connection with Chinese Patent Application No. 202110853171.9, dated Jun. 2, 2024, 18 pages. [English Translation Included].

The State Intellectual Property Office of People's Republic of China, "The Second Office Action and Supplementary search," issued in connection with Chinese Patent Application No. 202110853171.9, dated Nov. 28, 2024, 22 pages. [English Machine Translation Included].

Keqin et al., "Lifting Equipment Service Health Management Based on Big Data," Machine Industry Press, published Jan. 31, 2019, 16 pages. [English Machine Translation Included].

Song et al., "Performance Prediction of Photoelectric Detection System Based on Digital Twin," Computer Integrated Manufacturing Systems, vol. 25, Issue 6, Jun. 2019, 18 pages. [English Machine Translation Included].

Li et al., "Automatic Detection Technology," Metallurgical Industry Press, Textbooks for the 12th Five-Year Plan for General Higher Education, Jul. 31, 2014, 22 pages. [English Language Machine Translation Included].

European Patent Office, "Extended European Search Report," issued in connection with European Patent Application No. 25214805.1, dated Feb. 5, 2026, 11 pages.

* cited by examiner

FIG. 10

SYSTEMS, AND METHODS FOR DIAGNOSING AN ADDITIVE MANUFACTURING DEVICE USING A PHYSICS ASSISTED MACHINE LEARNING MODEL

CROSS-REFERENCE TO RELATED APPLICATIONS

This patent arises from U.S. Non-Provisional application Ser. No. 17/991,462, which was filed on Nov. 21, 2022, which claims priority to U.S. Non-Provisional application Ser. No. 17/386,396, which was filed on Jul. 27, 2021, which claims priority to U.S. Provisional Patent Application Ser. No. 63/057,554, which was filed on Jul. 28, 2020. U.S. Provisional Patent Application Ser. No. 63/057,554, U.S. Non-Provisional application Ser. No. 17/386,396, and U.S. Non-Provisional application Ser. No. 17/991,462 are hereby incorporated herein in their entireties for all purposes.

FIELD

The present disclosure relates to systems, and methods for diagnosing an additive manufacturing device, and more specifically, for diagnosing components or subsystems of the additive manufacturing device using a physics assisted machine learning model.

BACKGROUND

In additive manufacturing processes such as electron-beam melting of a powder layer to create an article, there exist some challenges to diagnose aborted or failed builds or identify performance issues of an additive manufacturing device. Specifically, an expert has to manually diagnose a build of the device, which requires a significant amount of time and human labor. In addition, finding a root cause of a failure of the additive manufacturing device is a difficult and time-consuming process. Thus, it may be necessary to diagnose a failure of the additive manufacturing device with reduced time and find an exact cause for the failure of the additive manufacturing device.

BRIEF DESCRIPTION OF THE DRAWINGS

FIG. 10 illustrates an example additive manufacturing diagnosis system including circuitry or modules to monitor, diagnose, and adjust an additive manufacturing device.

Figure 1:
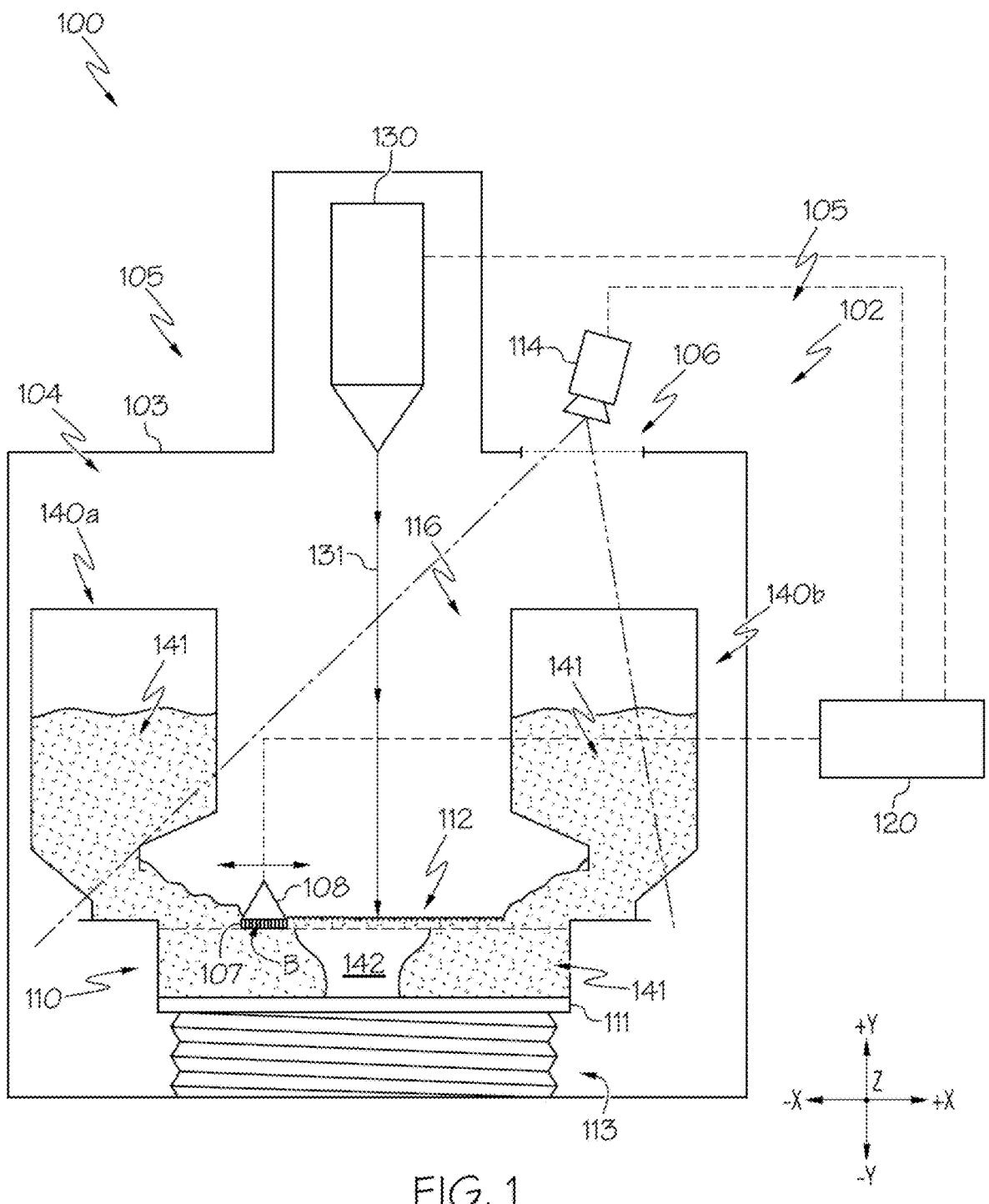
FIG. 1 depicts an additive manufacturing system of the present disclosure, according to one or more embodiments shown and described herewith.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The present disclosure generally relates to devices, systems, and methods for diagnosing an additive manufacturing device. The systems and methods obtain one or more parameters for a digital twin of a component of an additive manufacturing device based on raw data from the component of the additive manufacturing device, generate physics features for the component of the additive manufacturing device based on the one or more parameters and one or more transfer functions, obtain one or more classifiers for classifying the component as a first condition or a second condition based on physics features, and determine a health of the component based on the generated physics features for the component of the additive manufacturing device and the one or more classifiers. The systems and methods according to the present disclosure diagnose issues of the additive manufacturing device in a matter of few minutes without requiring manual analysis. In addition, the systems and methods according to the present disclosure enhances the accuracy of diagnosing builds and/or additive manufacturing devices by considering expected efficiency drop due to wear and tear of the additive manufacturing device.

Additive manufacturing systems may use an electron-beam or a laser beam to manufacture builds. Additive manufacturing systems may include multiple electron-beam guns or laser designs. Electron-beam additive manufacturing, which may also be known as electron-beam melting (EBM), is a type of additive manufacturing (3D printing) process that is typically used for metallic articles. EBM utilizes a raw material in the form of a metal powder or a metal wire, which is placed under a vacuum (e.g., within a vacuum sealed build chamber). Generally speaking, the raw material is fused together from heating via an electron beam.

Systems that utilize EBM generally obtain data from a 3D computer-aided design (CAD) model and use the data to place successive layers of the raw material using an apparatus to spread the raw material, such as a powder distributor. The successive layers are melted together utilizing a computer-controlled electron beam. As noted above, the process takes place under vacuum within a vacuum sealed build chamber, which makes the process suited to manufacture parts using reactive materials having a high affinity for oxygen (e.g., titanium). In embodiments, the process operates at higher temperatures (up to about 1,200° C.) relative to other additive manufacturing processes, which can lead to differences in phase formation though solidification and solid-state phase transformation.

Direct metal laser melting (DMLM) is another additive manufacturing process that uses lasers to melt ultra-thin layers of metal powder to build a three-dimensional object. Objects are built directly from a file generated from CAD (computer-aided design) data. The use of a laser to selectively melt thin layers of tiny particles yields objects exhibiting fine, dense and homogeneous characteristics. The DMLM process begins with a roller spreading a thin layer of metal powder on the print bed. Next, a laser is directed based on the CAD data to create a cross-section of the object by completely melting metal particles. The print bed is then lowered so the process can be repeated to create the next object layer. After all the layers are printed, the excess unmelted powder is brushed, blown or blasted away. The object typically requires little, if any, finishing. Embodiments described herein are applicable to other additive manufacturing modalities employing other types of additive manufacturing devices beyond those disclosed herein.

FIG. 1 depicts an additive manufacturing device of the present disclosure, according to one or more embodiments shown and described herewith. As shown in FIG. 1, an additive manufacturing system 100 includes at least a build chamber 102, an imaging device 114, and a control component 120. The build chamber 102 defines an interior 104 that is separated from an exterior environment 105 via one or more chamber walls 103. In some embodiments, at least a portion of the one or more chamber walls 103 of the build chamber 102 may include a window 106 therein. The imaging device 114 is generally located adjacent to the build chamber 102 in the exterior environment 105 (i.e., not located within the interior 104 of the build chamber 102) and is arranged such that a field of view 116 of the imaging device 114 extends through the window 106 into the interior 104 of the chamber.

In some embodiments, the interior 104 of the build chamber 102 may be a vacuum sealed interior such that an article 142 formed within the build chamber 102 is formed under optimal conditions for EBM or DMLM, as is generally understood. The build chamber 102 is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to the control component 120 such that the control component 120 directs operation of the vacuum system to maintain the vacuum within the interior 104 of the build chamber 102. In some embodiments, the vacuum system may maintain a base pressure of about $1 \times 10^{-5}$ mbar or less throughout an entire build cycle. In further embodiments, the vacuum system may provide a partial pressure of He or other reactive or inert control gas to about $2 \times 10^{-3}$ mbar during a melting process.

In other embodiments, the build chamber 102 may be provided in an enclosable chamber provided with ambient air and atmosphere pressure. In yet other embodiments, the build chamber 102 may be provided in open air.

The build chamber 102 generally includes within the interior 104 a powder bed 110 supporting a powder layer 112 thereon, as well as a powder distributor 108. In some embodiments, the build chamber 102 may further include one or more raw material hoppers 140a, 140b that maintain raw material 141 therein. In some embodiments, the build chamber 102 may further include an emitter 130. The build chamber 102 may further include other components, particularly components that facilitate EBM or DMLM, including components not specifically described herein.

The powder bed 110 is generally a platform or receptacle located within the interior 104 of the build chamber 102 that is arranged to receive the raw material 141 from the one or more raw material hoppers 140a, 140b. The powder bed 110 is not limited in size or configuration by the present disclosure, but may generally be shaped and sized to hold an amount of the raw material 141 from the raw material hoppers 140a, 140b in the form of the powder layer 112, one or more portions of article 142, and/or unfused raw material 141, as described in greater detail herein.

In some embodiments, the powder bed 110 may include a movable build platform 111 supported by a lifting component 113. The movable build platform 111 may generally be a surface within the powder bed 110 that is movable by the lifting component 113 in a system vertical direction (e.g., in the +y/−y directions of the coordinate axes of FIG. 1) to increase and/or decrease a total volume of the powder bed 110. For example, the movable build platform 111 within the powder bed 110 may be movable by the lifting component 113 in a downward direction (e.g., toward the −y direction of the coordinate axes of FIG. 1) so as to increase the volume of the powder bed 110. In addition, the movable build platform 111 may be movable by the lifting component 113 to add each successive powder layer 112 to the article 142 being formed, as described in greater detail herein.

The lifting component 113 is not limited by the present disclosure, and may generally be any device or system capable of being coupled to the movable build platform 111 and movable to raise or lower the movable build platform 111 in the system vertical direction (e.g., in the +y/−y directions of the coordinate axes of FIG. 1). In some embodiments, the lifting component 113 may utilize a linear actuator type mechanism to effect movement of the movable build platform 111. Illustrative examples of devices or systems suitable for use as the lifting component 113 include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component 113 may be located within the build chamber 102. In other embodiments, the lifting component 113 may be only partially located within the build chamber 102, particularly in embodiments where it may be desirable to isolate portions of the lifting component 113 that are sensitive to the harsh conditions (high heat, excessive dust, etc.) within the interior 104 of the build chamber 102.

The powder distributor 108 is generally arranged and configured to lay down and/or spread a layer of the raw material 141 as the powder layer 112 in the powder bed 110 (e.g., on start plate or build platform 111 within the powder bed 110). That is, the powder distributor 108 is arranged such that movement of the powder distributor 108 is in a horizontal plane defined by the x-axis and the z-axis of the coordinate axes depicted in FIG. 1. For example, the powder distributor 108 may be an arm, rod, or the like that extends a distance in the z direction of the coordinate axes of FIG. 1 over or above the powder bed 110 (e.g., from a first end to a second end of the powder bed 110). In some embodiments, the length of the powder distributor 108 may be longer than a width of the build platform 111 such that the powder layer 112 can be distributed on each position of the build platform 111. In some embodiments, the powder distributor 108 may have a central axis in parallel with a top surface of the build platform 111 (e.g., generally parallel to the +x/−x axis of the coordinate axes of FIG. 1). One or more motors, actuators, and/or the like may be coupled to the powder distributor 108 to effect movement of the powder distributor 108. For example, a rack and pinion actuator may be coupled to the powder distributor 108 to cause the powder distributor 108 to move back and forth over the powder bed in the +x/−x directions of the coordinate axes of FIG. 1, as indicated by the double-sided arrow depicted above the powder distributor 108 in FIG. 1. In some embodiments, movement of the powder distributor 108 may be continuous (e.g., moving without stopping, other than to change direction). In other embodiments, movement of the powder distributor 108 may be stepwise (e.g., moving in a series of intervals). In yet other embodiments, movement of the powder distributor 108 may be such that a plurality of interruptions occur between periods of movement.

As described in greater detail herein, the powder distributor may further include one or more teeth 107 (e.g., rake fingers or the like) that extend from the powder distributor 108 into the raw material 141 from the raw material hoppers 140a, 140b to cause disruption of the raw material 141 when the powder distributor 108 moves (e.g., to distribute the raw material 141, to spread the powder layer 112, etc.).

In embodiments, the powder distributor 108 includes a plurality of rake teeth 107 extending from a bottom surface B of the powder distributor 108 (e.g., extending generally towards the −y direction of the coordinate axes of FIG. 1). In some embodiments, the rake teeth 107 may extend in a direction that is substantially perpendicular to a plane of the build platform 111 (e.g., perpendicular to the plane formed by the x-axis and z-axis of the coordinate axes depicted in FIG. 1). In another embodiment, the rake teeth 107 may be slanted with respect to the build platform 111. An angle a of the slanted rake teeth 107 with respect to a normal to the build platform may be any value, and in some embodiments is between about 0 and about 45°.

In some embodiments, each one of the plurality of rake teeth 107 may be a metal foil or a metal sheet. The total length of the plurality of rake teeth 107 may be longer than a width of the build platform 111 in order to make it possible to distribute powder on each position of the build platform 111. The rake teeth 107 may be shaped and sized to rake through the raw material 141 to distribute the powder layer 112 on the build platform 111. Some embodiments may not include rake teeth 107.

It should be understood that while the powder distributor 108 described herein generally extends a distance in the x direction of the coordinate axes depicted in FIG. 1 and moves in the +x/−x directions of the coordinate axes depicted in FIG. 1 to spread the powder layer 112 as described above, this is merely one illustrative example. Other configurations are also contemplated. For example, the powder distributor 108 may rotate about an axis to spread the powder layer 112, may articulate about one or more joints or the like to spread the powder layer 112, and/or the like without departing from the scope of the present disclosure.

In some embodiments, a cross section of the powder distributor 108 may be generally triangular, as depicted in FIG. 1. However, it should be understood that the cross section may be any shape, including but not limited to, circular, elliptical, quadratic, rectangular, polygonal or the like. A height of the powder distributor 108 may be set in order to give the powder distributor 108 a particular mechanical strength in the system vertical direction (e.g., along the +y/−y axis of the coordinate axes of FIG. 1). That is, in some embodiments, the powder distributor 108 may have a particular controllable flex in the system vertical direction. The height of the powder distributor may also be selected taking into account that the powder distributor 108 pushes an amount of the raw material 141. If the height of the powder distributor 108 is too small, the powder distributor 108 can only push forward a smaller amount relative to a higher power powder distributor 108. However, if the height of the powder distributor 108 is too high, the powder distributor 108 may complicate the powder catching from a scree of powder, (e.g., the higher the height of the powder distributor 108, the more force may be required in order to catch a predetermined amount of powder from the scree of powder by moving the powder distributor 108 into the scree of powder and letting a predetermined amount of powder fall over the top of the powder distributor 108 from a first side in the direction of travel into the scree of powder to a second side in the direction of the build platform 111). In still yet other embodiments, the height of the powder distributor 108 may be such that areas adjacent to both a leading edge and a trailing edge of the powder distributor 108 are within a field of view 116 of the imaging device 114, as described herein.

In some embodiments, the powder distributor 108 may be communicatively coupled to the control component 120, as depicted by the dashed line in FIG. 1 between the powder distributor 108 and the control component 120. As used herein, the term "communicatively coupled" generally refers to any link in a manner that facilitates communications. As such, "communicatively coupled" includes both wireless and wired communications, including those wireless and wired communications now known or later developed. As the powder distributor 108 is communicatively coupled to the control component 120, the control component 120 may transmit one or more signals, data, and/or the like to cause the powder distributor 108 to move, change direction, change speed, and/or the like. For example, a "reverse direction" signal transmitted by the control component 120 to the powder distributor 108 may cause the powder distributor 108 to reverse the direction in which it is moving (e.g., reverse movement in the +x direction to movement in the −x direction).

Each of the raw material hoppers 140a, 140b may generally be containers that hold an amount of the raw material 141 therein and contain an opening to dispense the raw material 141 therefrom. While FIG. 1 depicts two raw material hoppers 140a, 140b, the present disclosure is not limited to such. That is, any number of raw material hoppers may be utilized without departing from the scope of the present disclosure. Further, while FIG. 1 depicts the raw material hoppers 140a, 140b as being located within the interior 104 of the build chamber 102, the present disclosure is not limited to such. That is, the raw material hoppers 140a, 140b may be located outside or partially outside the build chamber 102 in various other embodiments. However, it should be understood that if a raw material hopper is located outside or partially outside the build chamber 102, one or more outlets of the raw material hoppers that supply the raw material 141 may be selectively sealed when not distributing the raw material 141 in order to maintain the vacuum within the build chamber 102.

The shape and size of the raw material hoppers 140a, 140b are not limited by the present disclosure. That is, the raw material hoppers 140a, 140b may generally have any shape and or size without departing from the scope of the present disclosure. In some embodiments, each of the raw material hoppers 140a, 140b may be shaped and or sized to conform to the dimensions of the build chamber 102 such that the raw material hoppers 140a, 140b can fit inside the build chamber. In some embodiments, the raw material hoppers 140a, 140b may be shaped and sized such that a collective volume of the raw material hoppers 140a, 140b is sufficient to hold an amount of raw material 141 that is necessary to fabricate the article 142, which includes a sufficient amount of material to form each successive powder layer 112 and additional material that makes up the unfused raw material 141.

The raw material hoppers 140a, 140b may generally have an outlet for ejecting the raw material 141 located within the raw material hoppers 140a, 140b such that the raw material 141 can be spread by the powder distributor 108, as described herein. In some embodiments, such as the embodiment depicted in FIG. 1, the raw material 141 may freely flow out of the raw material hoppers 140a, 140b under the force of gravity, thereby forming piles or scree of raw material 141 for the powder distributor 108 to spread. In other embodiments, the outlets of the raw material hoppers 140a, 140b may be selectively closed via a selective closing mechanism so as to only distribute a portion of the raw material 141 located within the respective raw material hoppers 140a, 140b at a particular time. The selective closing mechanisms may be communicatively coupled to the control component 120 such that data and/or signals transmitted to/from the control component 120 can be used to selectively open and close the outlets of the raw material hoppers 140a, 140b.

The raw material 141 contained within the raw material hoppers 140a, 140b and used to form the article 142 is not limited by the present disclosure, and may generally be any raw material used for EBM or DMLM now known or later developed. Illustrative examples of raw material 141 includes, but is not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material 141 include, but are not limited to, Ti6Al4V titanium alloy, Ti6Al4V ELI titanium alloy, Grade 2 titanium, and ASTM F75 cobalt-chrome (all available from Arcam AB, Mölndal, Sweden). Another specific example of raw material 141 is INCONEL® alloy 718 available from Special Metals Corporation (Huntington WV).

In embodiments, the raw material 141 is pre-alloyed, as opposed to a mixture. This may allow classification of EBM or DMLM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

The emitter 130 is generally a device that emits an electron beam (e.g., a charged particle beam), such as, for example, an electron gun, a linear accelerator, or the like. The emitter 130 generates an energy beam 131 that may be used for melting or fusing together the raw material 141 when spread as the powder layer 112 on the build platform 111. In some embodiments, the emitter 130 may include at least one focusing coil, at least one deflection coil and an electron beam power supply, which may be electrically connected to an emitter control unit. In one illustrative embodiment, the emitter 130 generates a focusable electron beam with an accelerating voltage of about 60 kilovolts (kV) and with a beam power in the range of about 0 kilowatts (kW) to about 10 kW. The pressure in the vacuum chamber may be in the range of about $1\times10^{-3}$ mBar to about $1\times10^{-6}$ mBar when building the article 142 by fusing each successive powder layer 112 with the energy beam 131. The emitter 130 may sit in a gun vacuum chamber. The pressure in the gun vacuum chamber may be in the range of about $1\times10^{-4}$ mBar to about $1\times10^{-7}$ mBar. In some embodiments, the emitter 130 may emit a laser beam using direct metal laser melting (DMLM). The emitter 130 may emit laser to melt ultra-thin layers of metal powder to build a three-dimensional object. When using DMLM, a gas flow may be provided over a build in contrast with electron beam melting manufacturing that requires a vacuum chamber.

In some embodiments, the emitter 130 may be communicatively coupled to the control component 120, as indicated in FIG. 1 by the dashed line between the emitter 130 and the control component 120. The communicative coupling of the emitter 130 to the control component 120 may provide an ability for signals and/or data to be transmitted between the emitter 130 and the control component 120, such as control signals from the control component 120 that direct operation of the emitter 130 or raw data from the emitter 130 that contains health information pertaining to the build process.

Still referring to FIG. 1, the imaging device 114 is generally located in the exterior environment 105 outside the build chamber 102, yet positioned such that the field of view 116 of the imaging device 114 is through the window 106 of the build chamber 102. The imaging device 114 is generally positioned outside the build chamber 102 such that the harsh environment within the interior 104 of the build chamber 102 does not affect operation of the imaging device 114. That is, the heat, dust, metallization, x-ray radiation, and/or the like that occurs within the interior 104 of the build chamber 102 will not affect operation of the imaging device 114. In embodiments, the imaging device 114 is fixed in position such that the field of view 116 remains constant (e.g., does not change). Moreover, the imaging device 114 is arranged in the fixed position such that the field of view 116 of the imaging device 114 encompasses an entirety of the powder bed 110. That is, the imaging device 114 is capable of imaging the entire powder bed 110 within the build chamber 102 through the window 106.

In some embodiments, the imaging device 114 is a device particularly configured to sense electromagnetic radiation, particularly heat radiation (e.g., thermal radiation) that is generated by the various components within the powder bed 110 (e.g., the powder layer 112, the raw material 141, and/or the article 142). Thus, the imaging device 114 may generally be a device particularly tuned or otherwise configured to obtain images in spectra where heat radiation is readily detected, such as the visible spectrum and the infrared spectrum (including the far infrared and the near infrared spectrum). As such, one illustrative example of a device particularly tuned or otherwise configured to obtain images in spectra where heat radiation includes, but is not limited to, an infrared camera. In some embodiments, the imaging device 114 may be a camera that is sensitive within a range of wavelengths of about 1 micrometer (μm) to about 14 μm, including about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, or any value or range between any two of these values (including endpoints). As such, the imaging device 114 is suitable for imaging temperatures which occur during EBM or DMLM of the powder layer 112. In some embodiments, the wavelength sensitivity of the imaging device 114 may be selected in accordance with the type of raw material used. Illustrative examples of suitable devices that may be used for the imaging device 114 include, but are not limited to, an IR-camera (Infrared-camera), NIR-camera (Near Infrared-camera), a VISNIR-camera (Visual Near Infrared-camera), a CCD camera (Charged Coupled Device-camera), and a CMOS-camera (Complementary Metal Oxide Semiconductor-camera).

In some embodiments, the imaging device 114 may be an area scan camera that is capable of providing data specific to one or more regions of interest within the field of view 116, including regions of interest that move within the field of view 116. That is, an area scan camera includes a matrix of pixels that allows the device to capture a 2D image in a single exposure cycle with both vertical and horizontal elements. Area scan cameras can further be used to obtain a plurality of successive images, which is useful when selecting regions of interest within the field of view 116 and observing a change in the regions of interest, as described in greater detail herein. Illustrative examples of such area scan cameras include those available from Basler AG (Ahrensburg, Germany), JAI Ltd. (Yokohama, Japan), National Instruments (Austin, TX), and Stemmer Imaging (Puchheim, Germany).

In some embodiments, the imaging device 114 may have a monochrome image sensor. In other embodiments, the imaging device 114 may have a color image sensor. In various embodiments, the imaging device 114 may include one or more optical elements, such as lenses, filters, and/or the like. In a particular embodiment, the imaging device 114 may include a Bayer filter. As is generally understood, a Bayer filter is a color filter array (CFA) for arranging RGB color filters on a square grid of photosensors to create a color image, such as a filter pattern of about 50% green, about 25% red, and about 25% blue.

In some embodiments, the imaging device 114 may further be a device particularly configured to provide signals and/or data corresponding to the sensed electromagnetic radiation to the control component 120. As such, the imaging device 114 may be communicatively coupled to the control component 120, as indicated by the dashed lines depicted in FIG. 1 between the imaging device 114 and the control component 120.

It should be understood that, by locating the imaging device 114 in the exterior environment 105 outside the interior 104 of the build chamber 102, it is possible to easily retrofit existing build chambers having windows in the chamber walls 103 therein with a kit that includes the imaging device 114 so as to upgrade the existing build chambers with the capabilities described herein.

The control component 120 is generally a device that is communicatively coupled to one or more components of the additive manufacturing system 100 (e.g., the powder distributor 108, the imaging device 114, and/or the emitter 130) and is particularly arranged and configured to transmit and/or receive signals and/or data to/from the one or more components of the additive manufacturing system 100.

Figure 2:
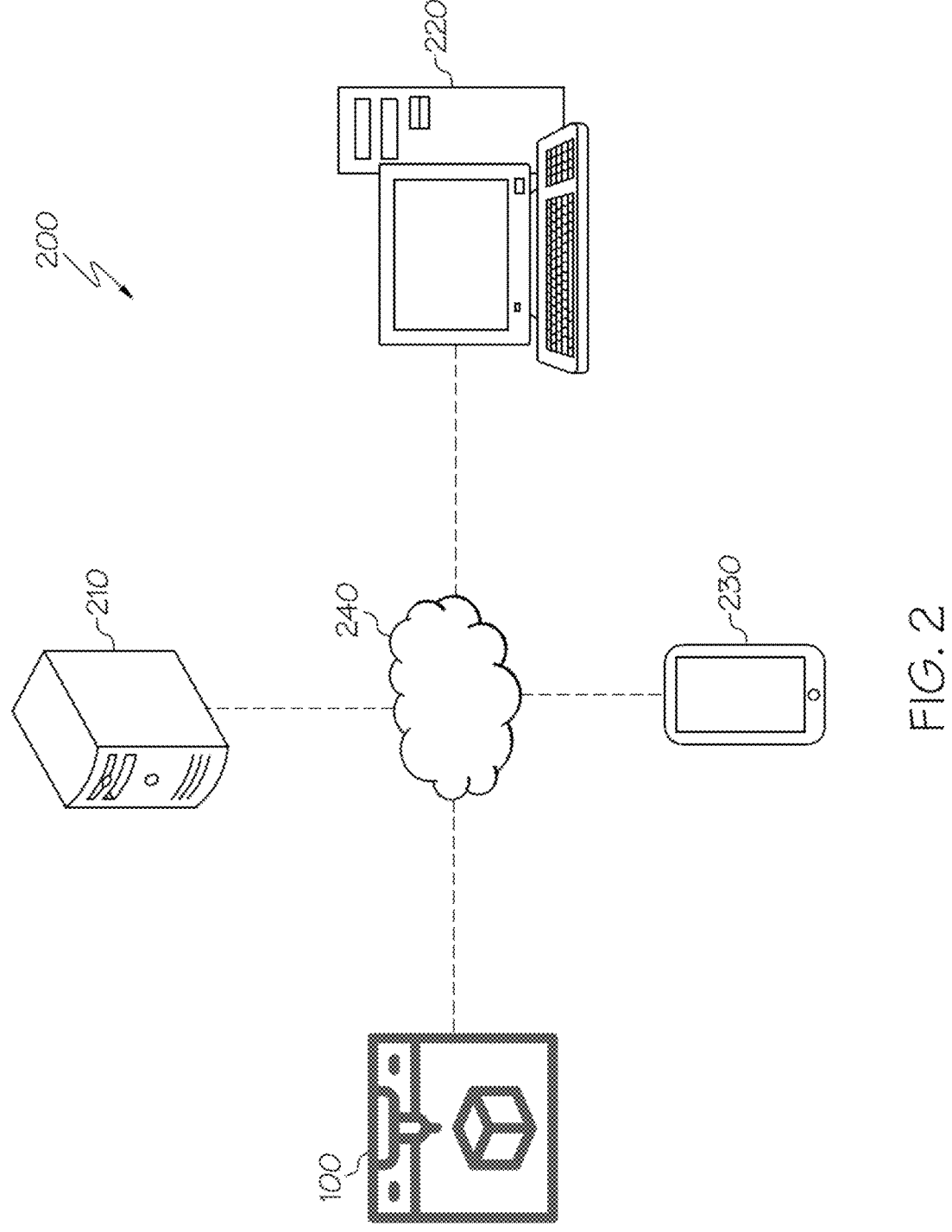
FIG. 2 is a block diagram of an example system according to one or more embodiments shown and described herein.

FIG. 2 is a block diagram of an exemplary system 200 according to one or more embodiments shown and described herein. In embodiments, the system 200 may include the additive manufacturing system 100, a server 210, a user computing device 220, and a mobile computing device 230. The additive manufacturing system 100 may be communicatively coupled to the server 210, the user computing device 220, and the mobile computing device 230 by a network 240. In embodiments, the network 240 may include one or more computer networks (e.g., a personal area network, a local area network, or a wide area network), cellular networks, satellite networks and/or a global positioning system and combinations thereof. Accordingly, the user computing device 220 can be communicatively coupled to the network 240 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

In embodiments, the additive manufacturing system 100 may transmit captured images and/or log files related to builds to the server 210, the user computing device 220, and/or the mobile computing device 230. The log files may include a plurality of parameters that are output from a plurality of subsystems of the additive manufacturing system 100 such as a vacuum system, a beam system, a powder layering system, and the like. The plurality of parameters may be raw data output from the additive manufacturing system 100, or parameters further processed based on machine operations. For example, parameters may be processed based on domain knowledge and or physics to generate new features and/or parameters. The image data and/or log files may be stored in the server 210, the user computing device 220, and/or the mobile computing device 230.

The server 210 generally includes processors, memory, and chipsets for delivering resources via the network 240. Resources may include providing, for example, processing, storage, software, and information from the server 210 to the user computing device 220 via the network 240. The server 210 may store machine learning models or statistical models on parameters from the additive manufacturing system 100.

The user computing device 220 generally includes processors, memory, and chipsets for communicating data via the network 240. The details of the user computing device 220 will be described below with reference to FIG. 4.

Figure 8:
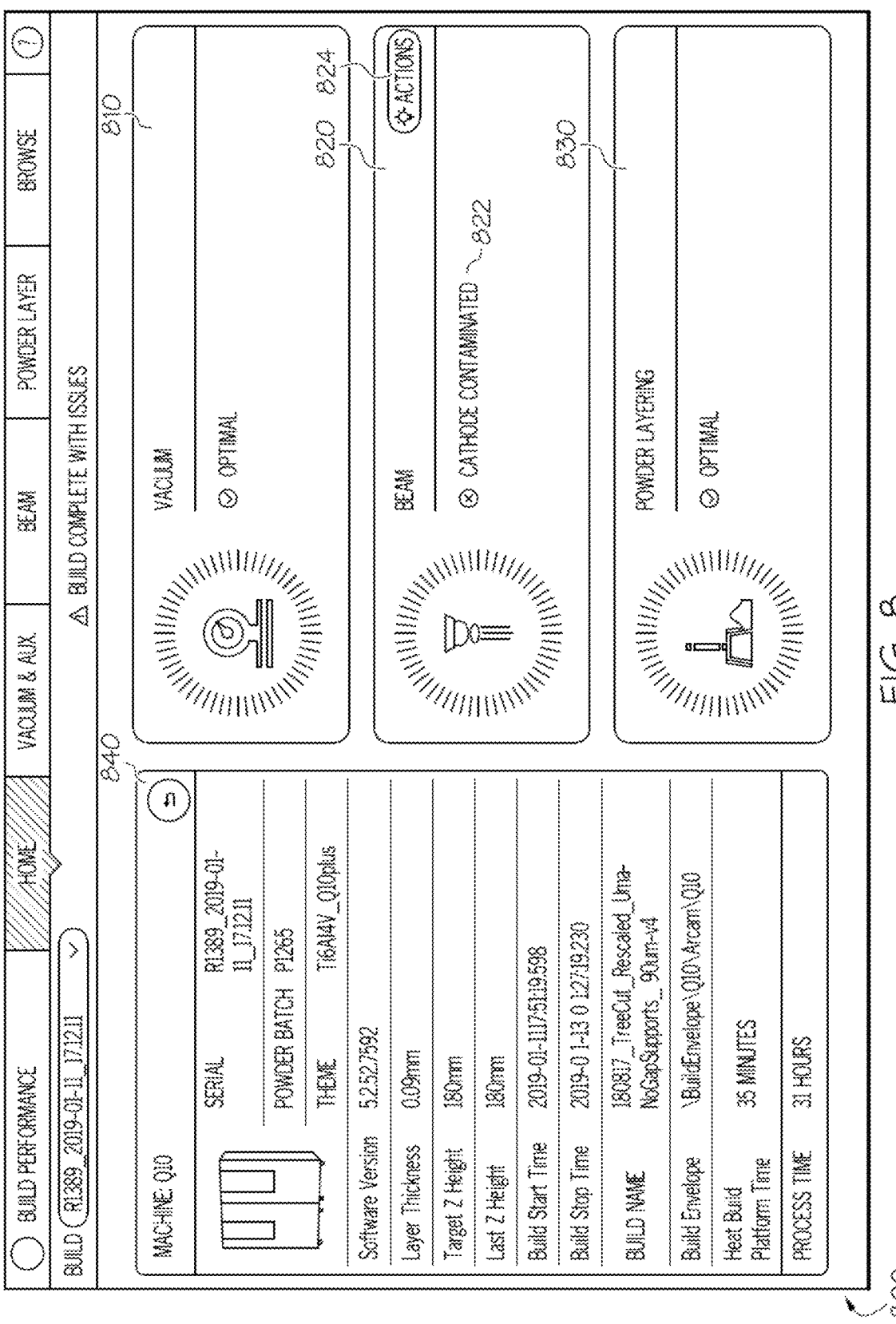
FIG. 8 depicts a user interface displaying status of subsystems of an additive manufacturing system, according to one or more embodiments shown and described herewith.

Referring to FIG. 2, the mobile computing device 230 may be any device having hardware (e.g., chipsets, processors, memory, etc.) for communicatively coupling with the network 240. Specifically, the mobile computing device 230 may include an antenna for communicating over one or more of the wireless computer networks described above. Moreover, the mobile computing device 230 may include a mobile antenna for communicating with the network 240. Accordingly, the mobile antenna may be configured to send and receive data according to a mobile telecommunication standard of any generation (e.g., 1G, 2G, 3G, 4G, 5G, etc.). Specific examples of the mobile computing device 230 include, but are not limited to, smart phones, tablet devices, e-readers, laptop computers, or the like. The mobile computing device 230 may have a display similar to the display device 408 of the user computing device 220 and display user interfaces, e.g., interfaces illustrated in FIG. 8.

Referring to FIG. 2, the network 240 generally includes a plurality of base stations that are configured to receive and transmit data according to mobile telecommunication standards. The base stations are further configured to receive and transmit data over wired systems such as public switched telephone network (PSTN) and backhaul networks. The network 240 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Figure 3:
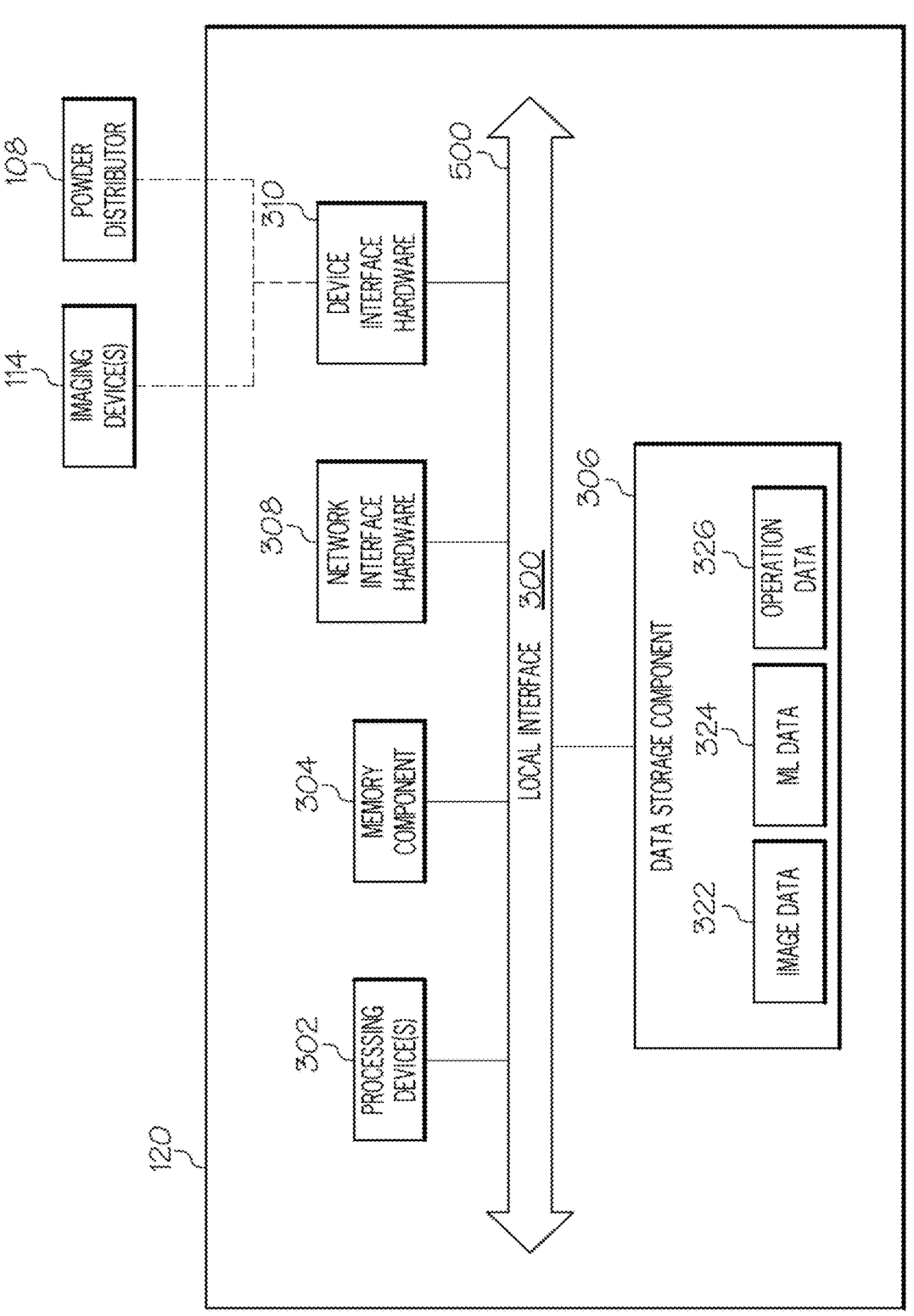
FIG. 3 depicts various internal components of a control component of an additive manufacturing system, according to one or more embodiments shown and described herein.

Turning to FIG. 3, the various internal components of the control component 120 depicted in FIG. 1 are shown. Particularly, FIG. 3 depicts various system components for collecting parameters and images for operating the additive manufacturing system 100, analyzing parameters and image data and/or assisting with the control of various components of the additive manufacturing system 100 depicted in FIG. 1.

As illustrated in FIG. 3, the control component 120 may include one or more processing devices 302, a non-transitory memory component 304, network interface hardware 308, device interface hardware 310, and a data storage component 306, all of which are interconnected by a local interface 300, such as a bus or the like.

The one or more processing devices 302, such as a computer processing unit (CPU), may be the central processing unit of the control component 120, performing calculations and logic operations to execute a program. The one or more processing devices 302, alone or in conjunction with the other components, are illustrative processing devices, computing devices, processors, or combinations thereof. The one or more processing devices 302 may include any processing component configured to receive and execute instructions (such as from the data storage component 306 and/or the memory component 304).

The memory component 304 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 304 may include one or more programming instructions thereon that, when executed by the one or more processing devices 302, cause the one or more processing devices 302 to complete various processes.

Still referring to FIG. 3, the programming instructions stored on the memory component 304 may be embodied as a plurality of software logic modules, where each logic module provides programming instructions for completing one or more tasks.

Still referring to FIG. 3, the network interface hardware 308 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 308 may be used to facilitate communication between the additive manufacturing system 100 and external devices such as the server 210, the user computing device 220, the mobile computing device 230 and the like via a network 240 as shown in FIG. 2.

Referring to FIG. 3, the device interface hardware 310 may communicate information between the local interface 300 and one or more components of the additive manufacturing system 100 of FIG. 1. For example, the device interface hardware 310 may act as an interface between the local interface 300 and the imaging device 114 of FIG. 1, the powder distributor 108, and/or the like. In some embodiments, the device interface hardware 310 may transmit or receive signals and/or data to/from the imaging device 114 of FIG. 1.

Still referring to FIG. 3, the data storage component 306, which may generally be a storage medium, may contain one or more data repositories for storing data that is received and/or generated. The data storage component 306 may be any physical storage medium, including, but not limited to, a hard disk drive (HDD), memory, removable storage, and/or the like. While the data storage component 306 is depicted as a local device, it should be understood that the data storage component 306 may be a remote storage device, such as, for example, a server computing device, cloud based storage device, or the like. Illustrative data that may be contained within the data storage component 306 includes, but is not limited to, image data 322, machine learning (ML) data 324, and/or operation data 326. The image data 322 may generally be data that is used by the control component 120 to recognize particular objects, determine one or more points on the powder layer 112 (FIG. 1), monitor an amount of electromagnetic radiation at the one or more points, determine a change in electromagnetic radiation, and/or the like. For example, the control component 120 may access the image data 322 to obtain a plurality of images received from the imaging device 114, determine an amount of electromagnetic radiation from the image data 322, and generate one or more commands accordingly.

Still referring to FIG. 3, the ML data 324 may be data that is generated as a result of one or more machine learning processes or statistical modelling processes used to determine features of the powder layer 112 (FIG. 1) from the image data 322. Still referring to FIG. 3, the operation data 326 may include parameters output from a plurality of subsystems from the additive manufacturing system 100. For example, the operation data 326 may include parameters output from a vacuum system, a beam system, a powder layering system, and the like. Specifically, parameters for the beam system may include, but are not limited to, a maximum power supply voltage, a minimum power supply voltage, a filament burn time, an average preheat grid voltage, a grid voltage drop after arctrip, an average cathode power, an average effective work function, an average smoke count, a smoke warning, an average column pressure, a number of arc trips, a maximum deviation in grid voltage, a grid voltage at 2 mA, and the like. Parameters for the vacuum system may include, but are not limited to, a maximum chamber pressure, a minimum chamber pressure, a maximum column pressure, a minimum column pressure, a vacuum failure error, an average variation in chamber vacuum, a minimum helium supply line pressure, an average current in chamber turbo pump, an average current in column turbo pump, a turbo pump idle duration, an average internal circuit temperature, an average incoming cooling water temperature, and the like.

It should be understood that the components illustrated in FIG. 3 are merely illustrative and are not intended to limit the scope of this disclosure. More specifically, while the components in FIG. 3 are illustrated as residing within the control component 120, this is a non-limiting example. In some embodiments, one or more of the components may reside external to the control component 120.

Figure 4:
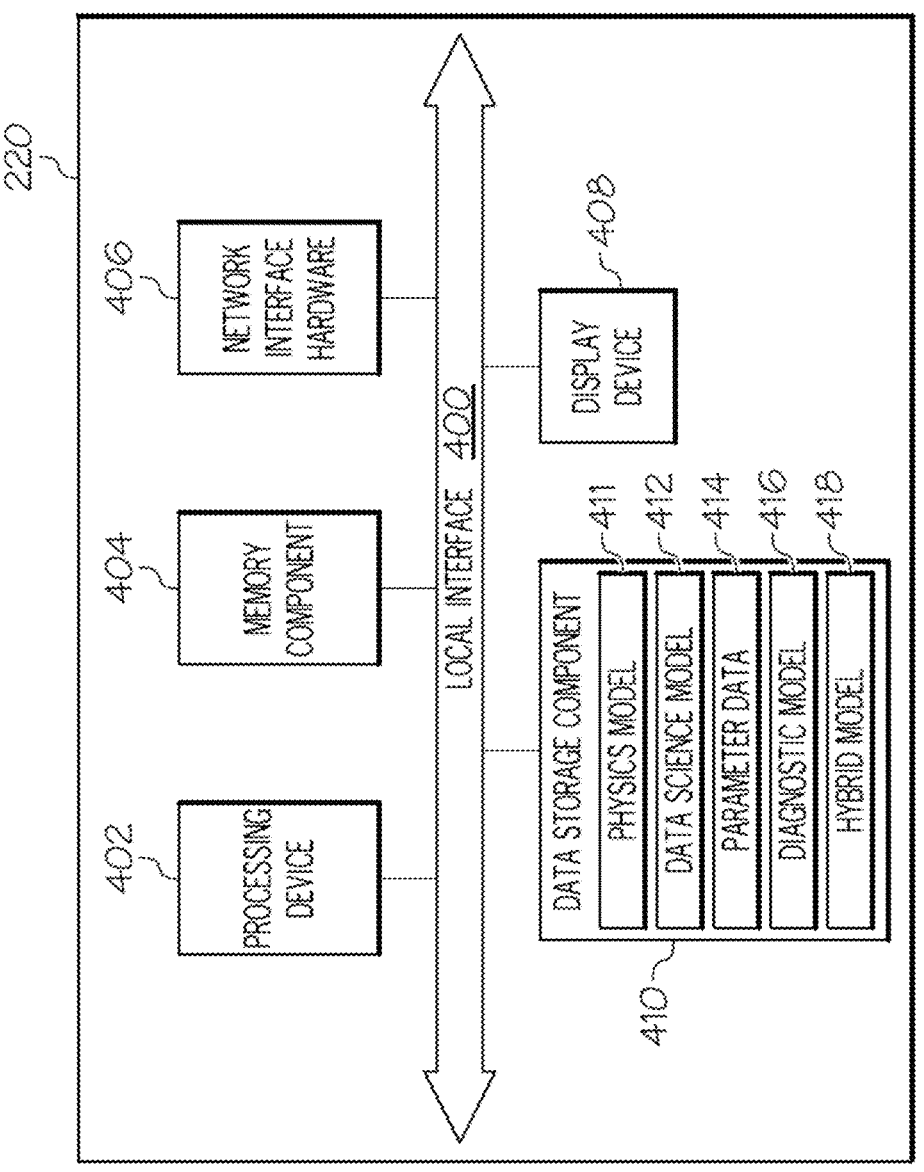
FIG. 4 depicts the various internal components of a user computing device communicating with an additive manufacturing system, according to one or more embodiments shown and described herein.

FIG. 4 depicts the various internal components of the user computing device 220 depicted in FIG. 2. As illustrated in FIG. 4, the user computing device 220 may include one or more processing devices 402, a non-transitory memory component 404, network interface hardware 406, a display device 408, and a data storage component 410, all of which are interconnected by a local interface 400, such as a bus or the like. While FIG. 4 depicts the components of the user computing device 220, the server 210 in FIG. 2 may have the same or similar components as illustrated in FIG. 4.

The one or more processing devices 402, such as a computer processing unit (CPU), may be the central processing unit of the user computing device 220, performing calculations and logic operations to execute a program. The one or more processing devices 402, alone or in conjunction with the other components, are illustrative processing devices, computing devices, processors, or combinations thereof. The one or more processing devices 402 may include any processing component configured to receive and execute instructions (such as from the data storage component 410 and/or the memory component 404).

The memory component 404 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 404 may include one or more programming instructions thereon that, when executed by the one or more processing devices 402, cause the one or more processing devices 402 to diagnose a component or a build of the additive manufacturing system.

Still referring to FIG. 4, the display device 408 may include any medium capable of transmitting an optical output such as, for example, a cathode ray tube, a light emitting diode (LED) display, an organic light emitting diode (OLED) display, a liquid crystal display, a plasma display, or the like. In embodiments, the display device 408 may be a touchscreen that, in addition to visually displaying information, detects the presence and location of a tactile input upon a surface of or adjacent to the display device 408.

Still referring to FIG. 4, the data storage component 410, which may generally be a storage medium, may contain one or more data repositories for storing data that is received and/or generated. The data storage component 410 may be any physical storage medium, including, but not limited to, a hard disk drive (HDD), memory, removable storage, and/or the like. While the data storage component 410 is depicted as a local device, it should be understood that the data storage component 410 may be a remote storage device, such as, for example, a server computing device, cloud based storage device, or the like. The data storage component 410 may include, but is not limited to including, a physics model 411, a data science model 412, parameter data 414, a diagnostic model 416, and a hybrid classification model 418.

Each of the physics model 411, the data science model 412, the parameter data 414, the diagnostic model 416, and the hybrid model 418 may be program modules in the form of operating systems, application program modules, and other program modules stored in the data storage component 410. Such program modules may include, but are not limited to, routines, subroutines, programs, objects, components, data structures, and the like for performing specific tasks or executing specific data types as will be described below.

The physics model 411 may be a digital twin of one or more of the components or subsystems of the additive manufacturing system 100. In embodiments, the physics model 411 may be a physics based digital twin of a vacuum subsystem, a beam subsystem, and/or a powder layering subsystem of the additive manufacturing system 100. The physics model 411 engineers and extracts features from raw data output from the additive manufacturing system 100. For example, in case the physics model 411 is a physics based digital twin of the beam subsystem, parameters such as grid voltage and beam current may be extracted from the raw data output from the additive manufacturing system 100. These parameters may be decomposed into their individual processes. For example, a physics based model for a cathode health may be designed and developed using the following transfer functions:

Cathode Temperature=$f$(Cathode Power)

Cathode Brightness=$f$(beam current, grid voltage)

Vacuum Environment may be a ratio of an actual vacuum level to an ideal vacuum level. The cathode brightness function may be designed as a function of cathode power, beam current, and/or grid voltage.

The physics model 411 may provide a severity health indicator for the cathode. The cathode health severity indicator may be employed to develop a cumulative damage model to estimate remaining life.

The data science model 412 is a confidence model obtained from a trained machine learning model or a statistical model. The trained machine learning model or statistical model is a machine learning model or a statistical model trained based on log files including numerous parameters, a list of desired parameters and/or time series data. The data science model 412 may be developed based on four steps: data extractions, data transformation and compression, feature extractions, and feature selections. The data extractions may include extracting time series, events such as process start and end times, and status/error messages related to builds manufactured by the additive manufacturing system 100. Once extracted, the data may be transformed and/or compressed depending on needs for subsequent utilization of such data. The feature extractions may extract features such as statistical features, transient behavior features, abnormal deviations/exceedances, domain (process and machine) based features, and the like related to builds manufactured by the additive manufacturing system 100. The features selection may include selecting statistical analysis methods and machine learning classifiers or statistical model classifiers. The data science model 412 may include threshold parameters for determining a condition of subsystems of the additive manufacturing system 100.

The parameter data 414 may include a plurality of parameters that are output from a plurality of subsystems of the additive manufacturing system 100 such as a vacuum system, a beam system, a powder layering system, and the like. The plurality of parameters may be raw data output from the additive manufacturing system 100 and/or parameters further processed based on machine operations, for example. The parameters may include parameters extracted from the image data 322 of the control component 120.

The diagnostic model 416 may include a plurality of failure modes. Each of the failure modes may be associated with one or more of the subsystems of the additive manufacturing system 100. The failure mode may include, but is not limited to, a rake stuck failure more, a cathode contamination or damage failure mode, a vacuum failure mode and the like. The failure mode may include one or more root cause identifications. For example, the failure mode of the cathode contamination or damage may include root causes such as a cathode contamination, an arc trip, or a wrong position of the cathode, and the like. Each of the root causes may be associated with analysis of the parameters of the additive manufacturing system 100. For example, if the parameters of additive manufacturing system 100 indicate lower brightness, a cathode contamination may be determined as a root cause. Each of the failure modes may be determined based on comparison of the parameters for the additive manufacturing system 100 and threshold parameters stored in the data science model 412.

The hybrid model 418 may compare the results from the physics model 411 and the data science model 412 and assess the health of the subsystems of the additive manufacturing system 100. For example, the physics model 411 can be built (e.g., trained and tested) to determine cathode condition using multiple failure modes to provide a cathode damage score. Similarly, a supervised data science model 412 is developed using real world cathode failure data (Y) and different process features (Xs). The data science model 412 is used to determine cathode condition. The hybrid model 418 takes outputs from both models 411, 412 and combines the outputs with weights assigned according to a relative confidence level of predictions associated with each model 411, 412. The weighted outputs form a comparison used with the hybrid model 418 to assess health (e.g., cathode subsystem health, etc.).

Figure 5A:
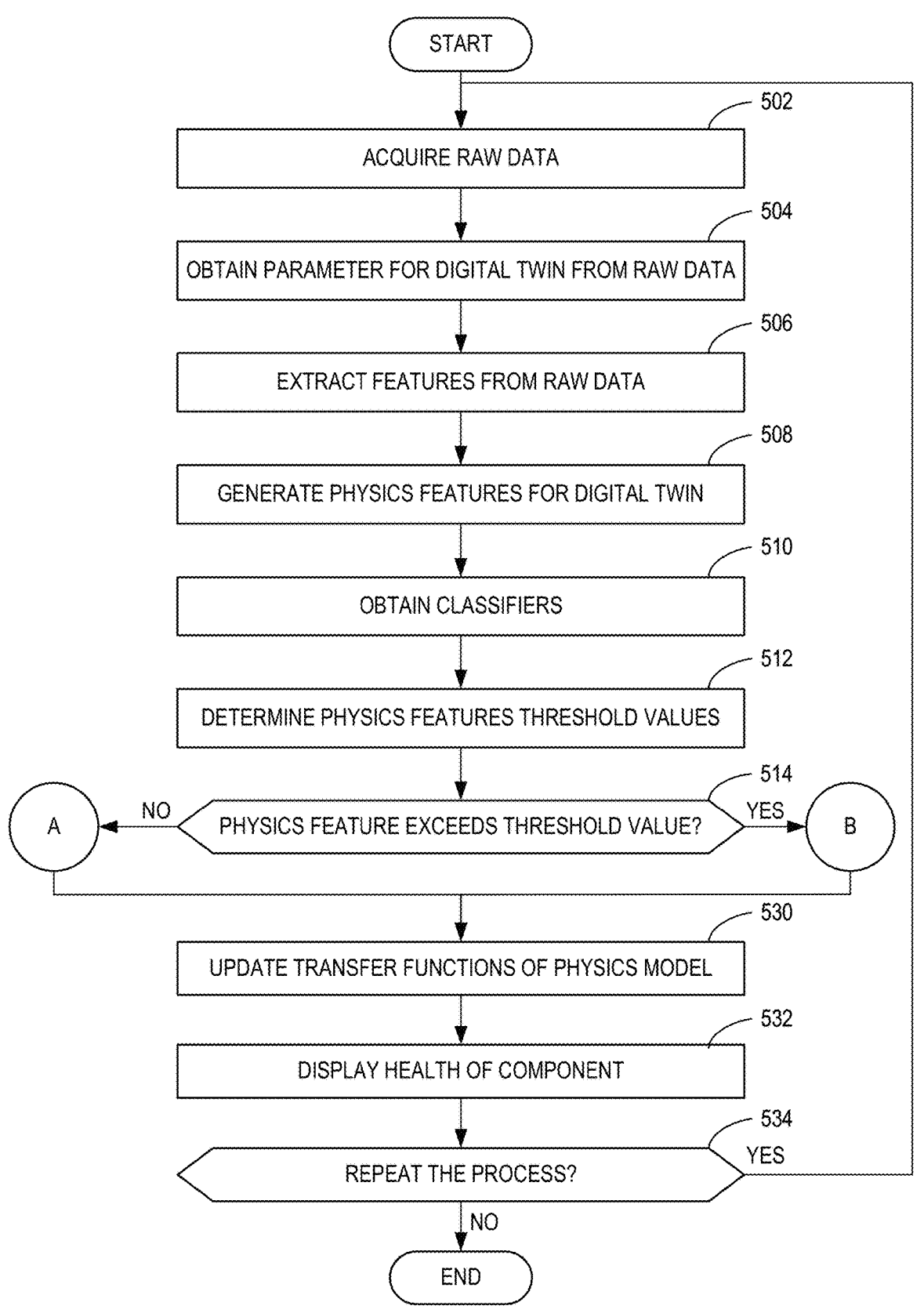
FIGS. 5A-C depict flow charts of an example method to diagnose an additive manufacturing device and provide diagnosis results, according to one or more embodiments shown and described herein.
Figures 5B, 5C:
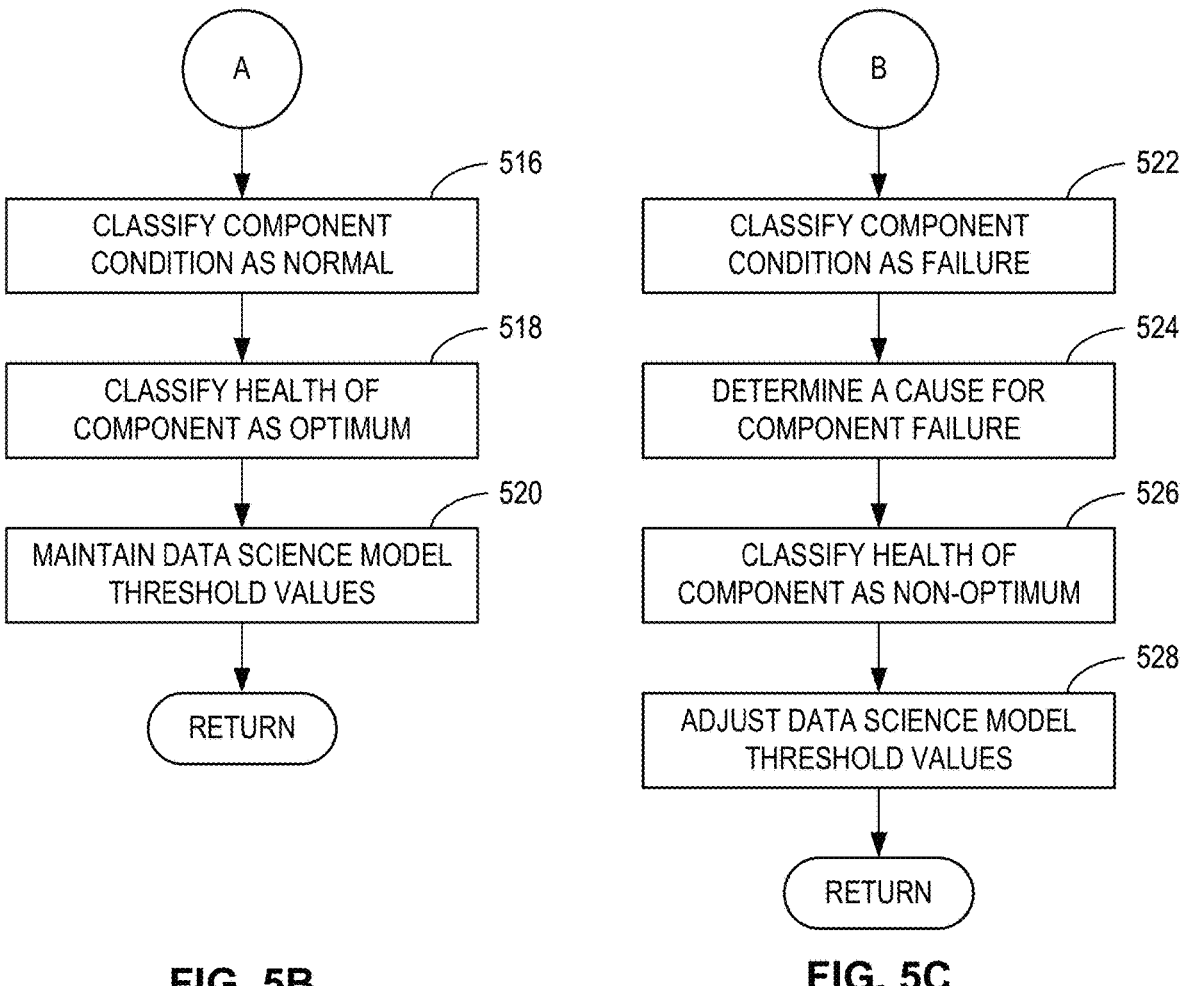

FIGS. 5A-C depict flow charts illustrating example methods to diagnose an additive manufacturing device and providing diagnosis results, according to one or more embodiments show and described herein.

In FIG. 5A at block 502, the system acquires raw data from one or more components of the additive manufacturing device from sensors within the additive manufacturing system 100 or log files for builds manufactured by the additive manufacturing device. For example, if the component of the additive manufacturing device is a cathode, the raw data includes a grid voltage and a beam current for the cathode.

At block 504, a system may obtain one or more parameters for a digital twin of a component of the additive manufacturing device based upon the raw data from the component of the additive manufacturing device. For example, the parameter may include a plurality of parameters that are output from a plurality of subsystems of the additive manufacturing system 100, such as a smoke error parameter, a rake failure detection parameter, etc.

Figure 6:
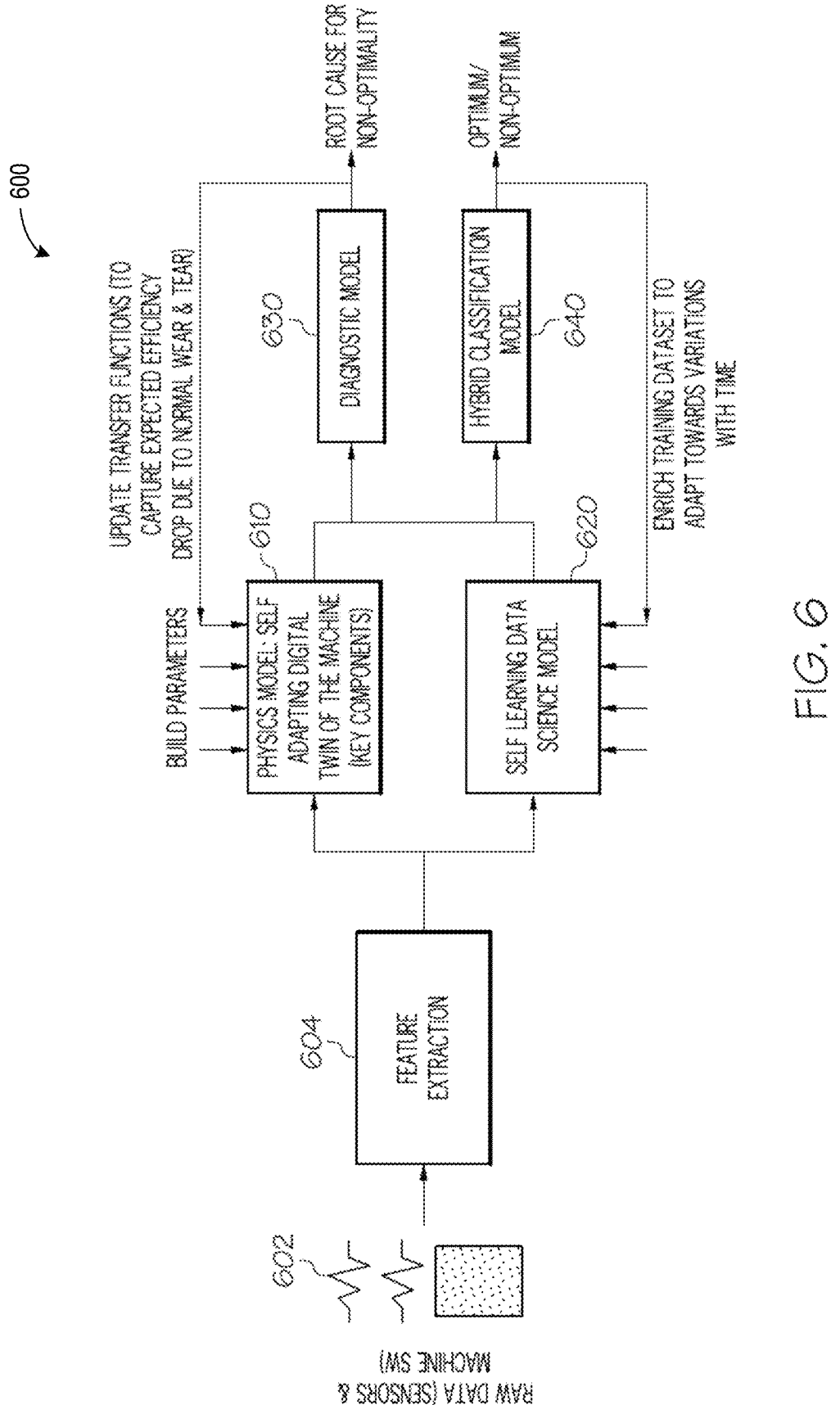
FIG. 6 depicts a physics assisted machine learning model for predicting and correcting health of an additive build process, according to one or more embodiments shown and described herewith.

At block 506, a feature extraction module 604 may extract features such as statistical features, transient behavior features, abnormal deviations/exceedances, domain (process and machine) based features, and the like related to builds manufactured by the additive manufacturing device. The feature extraction module 604 may engineer and extract features from raw data output from the additive manufacturing system 100. Referring to FIG. 6, a physics model 610 may be a self-adopting digital twin of the additive manufacturing device. For example, in case the physics model is a physics based digital twin of a cathode of the additive manufacturing system 100, parameters such as grid voltage and beam current may be extracted from the raw data output from the additive manufacturing system 100. These parameters may be decomposed into their individual processes, for example.

Referring back to FIG. 5A, at block 508, the system may generate physics features for the component of the additive manufacturing device based on the one or more parameters and one or more transfer functions. For example, one or more transfer functions may include functions that transfer beam current and a grid voltage into cathode brightness. The transfer functions may be adjusted based on usage time of the additive manufacturing system 100 or wear and tear of the additive manufacturing system 100. For example, as illustrated in FIG. 6, outputs from the diagnostic model 630 may be used to update the transfer functions of the physics model 610 to capture expected efficiency drop due to normal wear and tear of the component of the manufacturing device.

Referring back to FIG. 5A, at block 510, the system may obtain one or more classifiers for classifying the component as a first condition or a second condition based on physics features. In certain embodiments, a data science model such as the data science model 412 in FIG. 4 may store one or more classifiers. The one or more classifiers may classify the component as in a normal condition or in a failure condition based on a comparison of a set of threshold values with the physics features, for example.

Figure 7A:
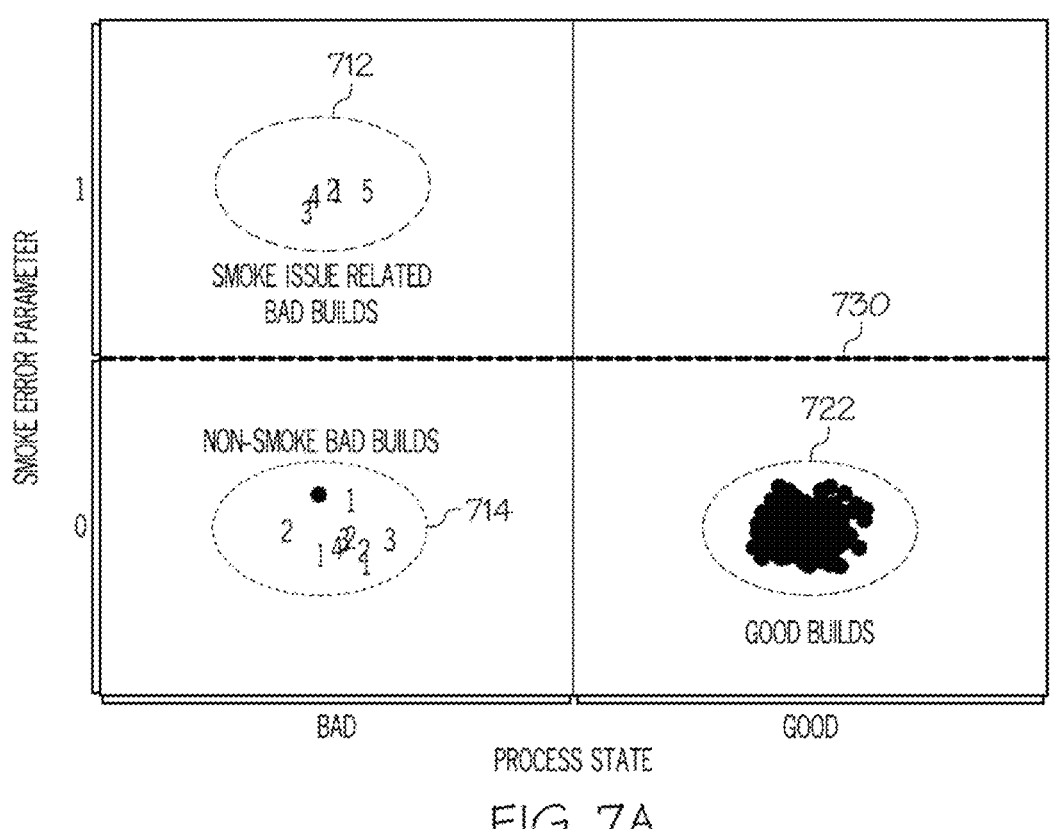
FIG. 7A depicts determining a threshold value for a smoke error parameter based on a set of bad builds and a set of good builds, according to one or more embodiments shown and described herewith.
Figure 7B:
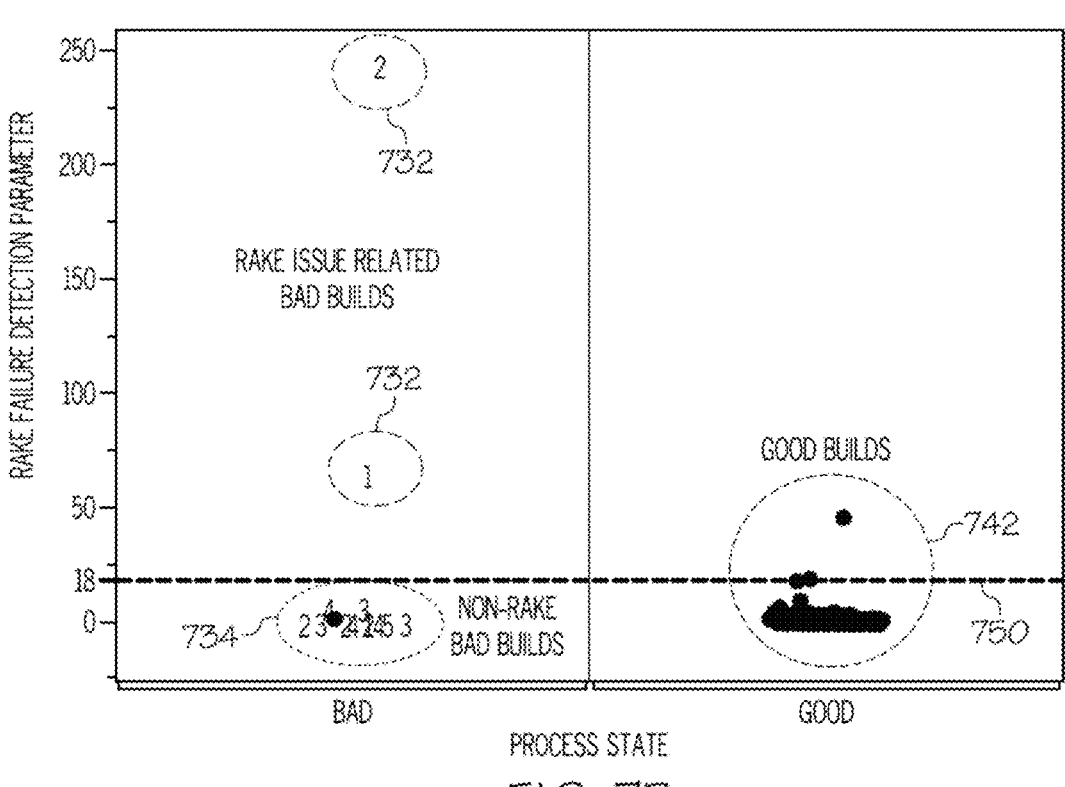
FIG. 7B depicts determining a threshold value for a rake failure detection parameter based on a set of bad builds and a set of good builds, according to one or more embodiments shown and described herewith.

Referring back to FIG. 5A, at block 512, the system determines the set of threshold values for the physics features. The threshold values may be determined based on machine learning or statistical models based on good or bad data, extracted features, and desired modules. For example, by referring to FIG. 7A, a smoke error threshold value may be determined based on good or bad build data, and distinction among bad build data. Specifically, FIG. 7A illustrates a set of good builds 722 associated with smoke error parameters and two sets of bad builds 712 and 714 associated with smoke error parameters. The two sets of bad builds include a set of smoke issue related bad builds 712 and a set of non-smoke related bad builds 714. A value 730 between a set of smoke error parameters for the smoke issue related bad builds 712 and a set of smoke error parameters for non-smoke related bad builds 714 is determined as a threshold value for detecting a smoke error. For example, the value 730 may be 0.5. As another example, by referring to FIG. 7B, a rake failure detection threshold value may be determined based on good or bad build data, and distinction among bad build data. Specifically, FIG. 7B illustrates a set of good builds 742 associated with rake failure detection parameters and two sets of bad builds 732 and 734 associated with rake failure detection parameters. The two sets of bad builds include a set of rake issue related bad builds 732 and a set of non-rake related bad builds 734. A value 750 between a set of rake failure detection parameters for the rake issue related bad builds 732 and a set of rake failure detection parameters for non-rake related bad builds 734 is determined as a threshold value for detecting a rake failure. For example, the value 750 may be 18.

Referring back to FIG. 5A, at block 514, the system determines whether the selected physics feature exceeds the threshold value. If the physics feature does not exceed the threshold value, the process proceeds to block A, depicted in FIG. 5B. If the physics feature does exceed the threshold value, the process proceeds to block B, depicted in FIG. 5C.

FIG. 5B depicts a subset of instructions for diagnosing an additive manufacturing device if/when the physics feature does not exceed the threshold value. At block 516, the one or more classifiers of the data science model 620 of FIG. 6 classifies the component condition as normal (e.g., within expected operating parameters, etc., based on physics features. For example, the one or more classifiers classify the component condition as normal based on the comparison of threshold values with the physics features. If it is determined that the physics feature does not exceed the threshold value, the one or more classifiers indicate that the component condition is normal. For example, a classifier can evaluate/classify arc trips occurring in a ten minute rolling time window not exceeding one. Another example classifier can classify a minimum of an inlet valve opening not falling below 0.3, for example.

At block 518, the classification model 640 of FIG. 6 outputs an indication of the health of the component as optimum, normal, or expected. The system determines the health of the component based on the generated physics features for the component of the additive manufacturing component and the one or more classifiers. The hybrid model may compare the generated physics features for the component of the additive manufacturing device with threshold values of the one or more classifiers. For example, the generated physics feature of a cathode may be cathode brightness. The hybrid model 418 determines the health of the cathode based on the comparison of the cathode brightness with the threshold of the classifier. In some examples, by utilizing the deviations from the physics model 610 and the data science model 620, the classification model 640 may use a weighted average method to determine that the health of the cathode is optimum (otherwise referred to as normal or expected).

At block 520, the data science model 620 may maintain the training dataset or the threshold values. For example, the data science model 620 may maintain threshold values such as the smoke error threshold value or the rake failure detection threshold value in response to the classification model 640 outputting the health of the component as optimum. After maintaining the training dataset or threshold values accordingly, the process proceeds to block 530 of FIG. 5A.

FIG. 5C depicts a subset of instructions for diagnosing an additive manufacturing device if the physics feature exceeds the threshold value. At block 522, the one or more classifiers of the data science model 620 of FIG. 6 classifies the component condition as failure based on physics features. For example, the one or more classifiers classify the component condition as failure based on the comparison of threshold values with the physics features. If it is determined that the physics feature exceeds the threshold value, the one or more classifiers indicate that the component condition is a failure.

At block 524, the system may determine a cause for a failure of the component based on a comparison of the generated physics features of the first model and the one or more classifiers. For example, if the failure mode is a rake failure, the cause for the failure may include but not be limited to, old software, part swelling, or loss of lubrication in the rake mechanism. In certain embodiments, the processor of the user computing device 220 may determine a cause for failure based on parameters for the build. For example, if the rake current is relatively high (e.g., greater than 6 ampere, etc.), the processor of the user computing device 220 may determine that old software is the cause for the failure mode.

At block 526, the classification model 640 of FIG. 6 outputs the health of the component as non-optimum. The system determines the health of the component based on the generated physics features for the component of the additive manufacturing component and the one or more classifiers. The hybrid model may compare the generated physics features for the component of the additive manufacturing device with threshold values of the one or more classifiers.

For example, the generated physics feature of a cathode may be cathode brightness. In this example, the hybrid model 418 determines the health of the cathode based on the comparison of the cathode brightness with the threshold of the classifier. In some examples, by utilizing the deviations from the physics model 610 and the data science model 620, the classification model 640 may use a weighted average method to determine that the health of the cathode is non-optimum.

At block 528, the data science model 620 may update or adjust the training dataset or the threshold values. In certain embodiments, outputs from the hybrid classification model may be used to enrich training dataset for the data science model. For example, the training dataset for the data science model 620 may be updated or adjusted based on the output of the hybrid classification model 640, in order to reflect the usage time of the additive manufacturing system 100 or wear and tear of the additive manufacturing system 100, as illustrated in FIG. 6. When the output of the hybrid classification model 640 is determined as non-optimum, the output of the hybrid classification model 640 may be input to the data science model 620 to update or adjust the training dataset. After updating or adjusting the training dataset or threshold values accordingly, the process proceeds to block 530 of FIG. 5A.

Referring back to FIG. 5A, at block 530, outputs from the diagnostic model may be used to update transfer functions of the physics model to capture detected efficiency drop due to normal wear and tear of the additive manufacturing device. For example, the transfer functions for the physics model 610 may be updated or adjusted based on the output of the diagnostic model 630, in order to reflect the usage time of the additive manufacturing system 100 or wear and tear of the additive manufacturing system 100, as illustrated in FIG. 6. The diagnostic model 630 may output a prediction for a root cause for non-optimality of the additive manufacturing device (e.g., a root cause of a problem with a build and/or other problem with configuration and/or operation of the additive manufacturing device, etc.). For example, the output of the diagnostic model 630 (e.g., a prediction for a root cause for the non-optimality, etc.), may be used to update the transfer functions of the physics model 610 to capture expected efficiency drop due to normal wear and tear of the component of the manufacturing device.

For example, a root cause of beam quality deterioration can be due to a poor vacuum environment. A root cause of arc trip can be due to a poor vacuum environment resulting from insufficient cleanliness of the additive machine 100. A root cause of interference with the rake over a build envelope can be part swelling, for example.

At block 532, the system may display the component, the health of the component, or the cause for a failure of the component. For example, by referring to FIG. 8, the display device 408 of the user computing device 220 may display a page 800 showing windows for three subsystems of the additive manufacturing system 100: a vacuum subsystem window 810, a beam subsystem window 820, and a powder layering subsystem window 830. The processor of the user computing device 220 may determine that the failure mode of cathode contamination has occurred for a build. The display device 408 may display the failure mode 822 of cathode contamination in the beam subsystem window 820. The indication and location of the failure mode 822 is not limited to the indication and location shown in FIG. 8, and any other indication for the failure mode may be displayed at a different location. The display device 408 may also display various actions 824 from which the user can view options related to the correction of the health of the additive build process. The actions 824 includes information about root causes of the failure modes detected and recommendations to the machine/user to rectify/correct these issues. In some examples, the amount of time until a next service and/or maintenance action is required for a component may also be displayed in the actions 824, in the corresponding subsystem window, or any other appropriate location. In other examples, the actions 824 include actions to be implemented now. A button 840 may be included in the display 800, which flips the "card" or displayed content to show a plot including a trend of error events that occurred during a build.

At block 534, it is determined whether to repeat the process. For example, the process may be repeated for a different parameter of a component for the digital twin. If the process is to be repeated, control of the process returns to block 502. Otherwise, the process ends.

FIG. 6 depicts a physics assisted machine learning model 600 for predicting and correcting health of an additive build process, according to one or more embodiments shown and described herewith.

Raw data 602 may be obtained from sensors of the additive manufacturing device. In some embodiments, the raw data 602 may be stored in log files for builds manufactured by the additive manufacturing device. The feature extraction module 604 may receive the raw data 602 and extract, from the raw data, features such as statistical features, transient behavior features, abnormal deviations/exceedances, domain (process and machine) based features, and the like related to builds manufactured by the additive manufacturing device. The feature extraction module 604 may engineer and extract features from the raw data. The extracted features may be provided to the physics model 610 and the data science model 620.

The physics model 610 may be a self-adapting digital twin of the additive manufacturing device 100. For example, in case the physics model 610 is a physics based digital twin of a cathode of the additive manufacturing system 100, parameters such as grid voltage and beam current may be extracted from the raw data output from the additive manufacturing system 100. For example, raw data can include parameters of grid voltage and beam current. The raw parameters can then be disintegrated based on phases of beam operation. A statistical aggregation of a transfer function of phase-wise parameters can be employed to form or drive the physics model 610 (the physics-based digital twin model). The data science model 620 is a confidence model obtained from a trained machine learning model or a statistical model. The trained machine learning model or statistical model is a machine learning model or a statistical model trained based on log files including numerous parameters, a list of desired parameters and/or time series data.

For example, when the physics model 610 is implemented as a digital twin of the additive system 100 and/or one or more subsystems of the additive system 100, the example system 100 may include three modeled components, for example, each component having an activation input. For example, component 1 provides an activation input to component 2 and component 3. Component 2 provides a component output to component 3. Component 3 produces a final output. The digital twin includes a digital twin for component 1, a digital twin for component 2, and a digital twin for component 3. The digital twin for component 1 provides an activation/derived input for the digital twin for component 2 and the digital twin for component 3. The digital twin for component 2 provides a derived output to the digital twin of component 3. The digital twin for component 3 generates a final derived output. As such, the digital twin model 610 of the system 100 represents a health condition of each component in the system 100. The digital twin model 610 can optimize or improve parameters of the model 610 to match the final derived output of the digital twin for component 3 to the final output of component 3, for example.

The diagnostic model 630 may receive the output of the physics model 610 and the output of the data science model 620 and determine a root cause for non-optimality. For example, the diagnostic model 630 may analyze which factors in the cathode health indicator are influencing the cathode health the most. Then, based on the identified root cause for non-optimality, the diagnostic model 630 may suggest recommendations for addressing the root cause for non-optimality.

The hybrid model 640 may compare the output of the physics model 610 and the output of the data science model 620 to determine the health of a component as optimum or non-optimum. For example, the generated physics feature of a cathode may be cathode brightness. The hybrid classification model 640 may determine the health of the cathode based on the comparison of the cathode brightness with the threshold of the classifier from the data science model 620. Then, by utilizing the deviations from the physics model 610 and the data science model 620, the classification model 640 may use a weighted average method to classify the health of the cathode as optimum or non-optimum. The hybrid classification model 640 may also predict an amount of time until a next service and/or maintenance action is required.

Figure 9:
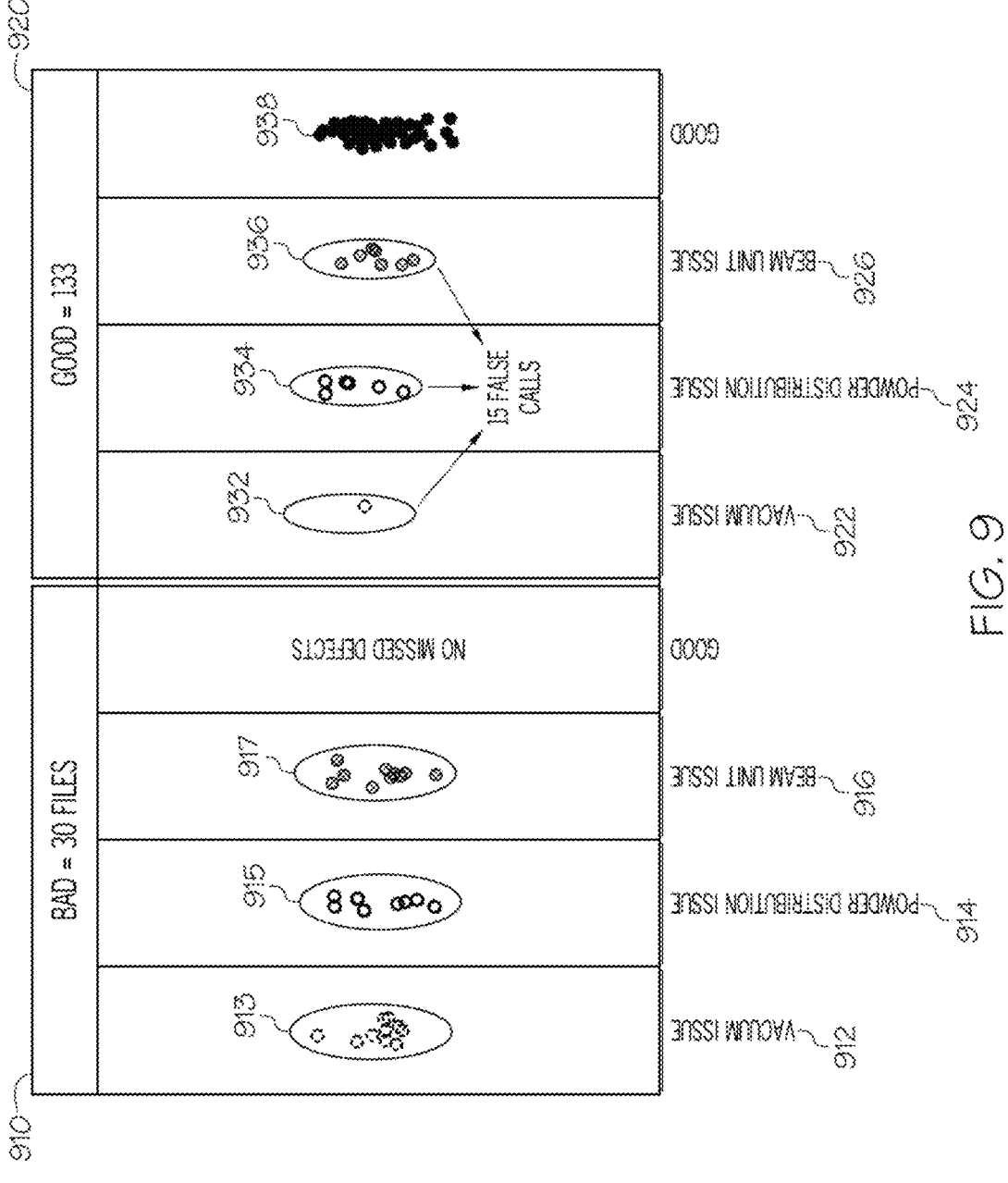
FIG. 9 depicts data science model results according to one or more embodiments shown and described herein.

FIG. 9 depicts data science model results according to one or more embodiments shown and described herein. FIG. 9 illustrates examples of completed or good builds 920 and aborted or bad builds 910. Thirty builds are classified as bad builds, and one hundred thirty three builds are classified as good builds. The data science model analyzed the components of the additive manufacturing system that were used for building the thirty bad builds 910. The data science model detected vacuum issues 912 for bad builds 913, power distribution issues 914 of the bad builds 915, and beam unit issues 916 for bad builds 917, as illustrated in FIG. 9. The data science model did not miss any defects with respect to the bad builds.

With respect to the good builds 920, the data science model identifies fifteen false calls. Specifically, the data science model identifies vacuum issues for the builds 932 that were previously identified as good builds, powder distribution issues for the builds 934 that were previously identified as good builds, and beam unit issues 936 that were previously identified as goods. Accordingly, the data science model enhances accuracy of identifying bad builds manufactured by the additive manufacturing device.

Figure 10:
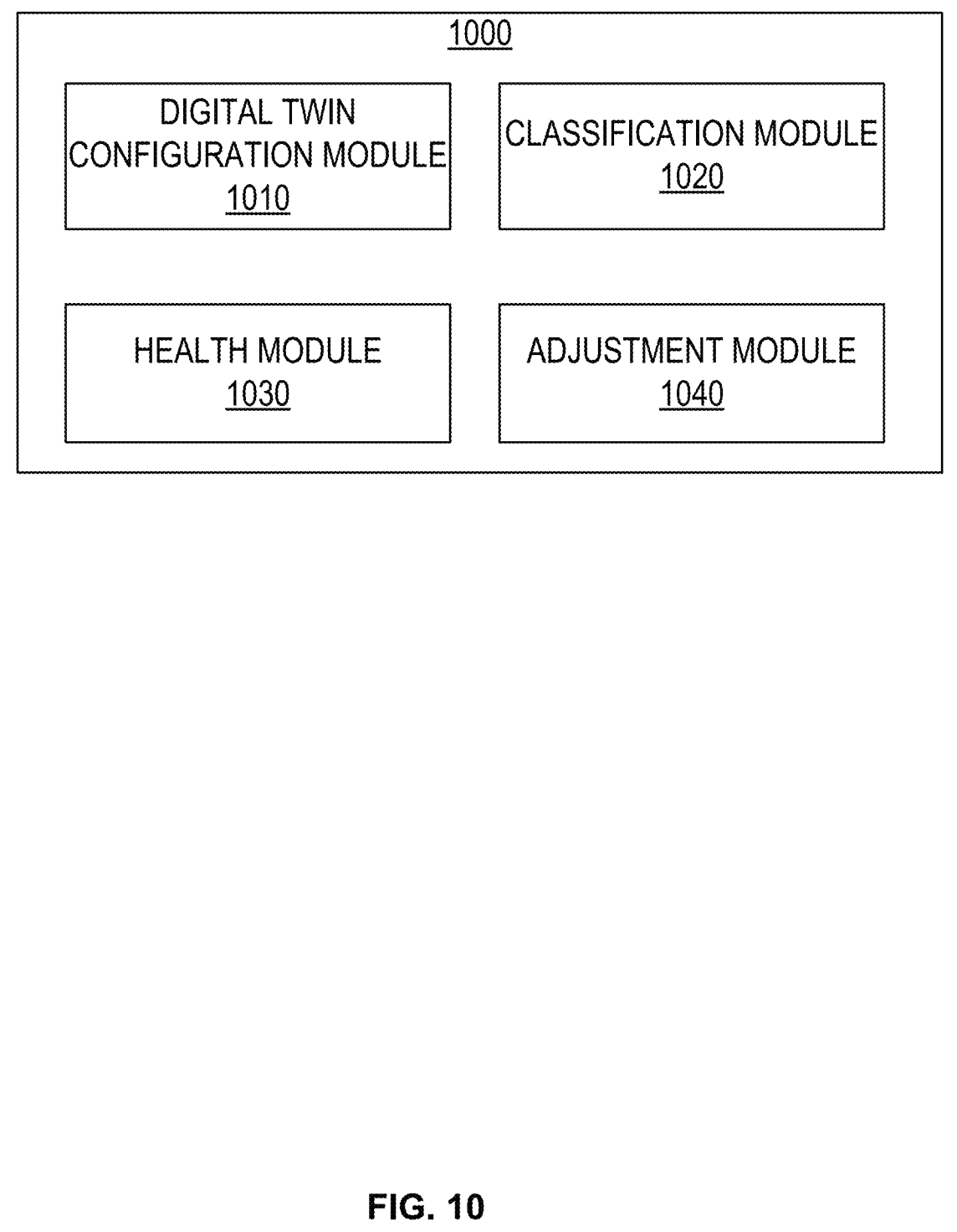

FIG. 10 illustrates an example additive manufacturing diagnosis system 1000 including circuitry or modules to monitor, diagnose, and adjust an additive manufacturing device. The example system 1000 includes a digital twin configuration module 1010, a classification module 1020, a health module 1030, and an adjustment module 1040. The example modules 1010-1040 of the system 1000 can be implemented using hardware, firmware, and/or software in various combinations to gather data; process data to transform the data into models, analysis, and/or actionable output; store data and associated model/analysis/output; output data/model/analysis/actionable output; adjust additive manufacturing device settings; generate alerts and messages; etc. In certain examples, the system 1000 can be implemented as part of the control component 120. In certain examples, the system 1000 can be implemented using one or more of the server 210, the user computing device 220, and the mobile computing device 230.

In certain examples, the digital twin configuration module 1010 obtains one or more parameters for a digital twin (e.g., the physics model 411) of a component of the additive manufacturing device 100 based on raw data from the component of the additive manufacturing device 100. The example digital twin configuration module 1010 generates physics features for the digital twin of the component of the additive manufacturing device based on the one or more parameters and one or more transfer functions, for example.

In certain examples, the classification module 1020 obtains one or more classifiers for classifying the component as a first condition or a second condition based on physics features. For example, features extracted from data output by the additive manufacturing device 100 by the feature extraction module 604 can be used with the physics model 411, data science model 412, and/or the hybrid model 418 to form classifier(s) to classify one or more conditions of the component according to the features. Such classification is further described above with respect to FIGS. 5A-C.

In certain examples, the health module 1030 determines a health of the component based on the generated physics features of the first module and the one or more classifiers. For example, the features and classifiers can be used such as by comparing the value of a feature to a threshold represented by a corresponding classifier to determine a health of the corresponding component. As described above with respect to FIGS. 5A-C, for example, a cathode brightness feature value can be compared to a cathode brightness threshold specified by a cathode brightness classifier to determine whether the cathode brightness is healthy, unhealthy, failing, etc. Other conditions such as smoke error, rake failure, etc., can be evaluated by the health module 1030.

In certain examples, the adjustment module 1040 reacts to the health determination(s) of the health module 1030 to provide an alert to the additive system 100, a user, the control component 120, the server 210, the user computing device 220, and/or the mobile computing device 230, etc. The adjustment module 1040 can adjust one or more parameters of the additive manufacturing device 100 (e.g., in communication with machine control software for process correction) based on an issue identified in the health of a component of the system/device 100, for example. For example, cathode power/intensity can be adjusted based on the health of the cathode brightness. The adjustment module 1040 can also update one or more transfer functions, classifiers, etc., based on the determined health of one or more components. Further, the adjustment module 1040 can determine a cause of a failure of the component(s) by comparing features and classifiers to adjust a setting or configuration, warn/alert of the error, adjust a build, etc.

It should now be understood that that the devices, systems, and methods described herein diagnose an additive manufacturing device. The systems and methods obtain one or more parameters for a digital twin of a component of an additive manufacturing device based on raw data from the component of the additive manufacturing device, generate physics features for the component of the additive manufacturing device based on the one or more parameters and one or more transfer functions, obtain one or more classifiers for classifying the component as a first condition or a second condition based on physics features, and determine a health of the component based on the generated physics features for the component of the additive manufacturing device and the one or more classifiers. The systems and methods according to the present disclosure diagnose issues of the additive manufacturing device in a matter of few minutes without requiring manual analysis. In addition, the systems and methods according to the present disclosure enhances the accuracy of diagnosing builds and/or additive manufacturing device by considering expected efficiency drop due to wear and tear of the additive manufacturing device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A system for diagnosing an additive manufacturing device is provided. The system includes a first module configured to: obtain one or more parameters for a digital twin of a component of the additive manufacturing device based on raw data from the component of the additive manufacturing device; and generate physics features for the digital twin of the component of the additive manufacturing device based on the one or more parameters and one or more transfer functions; a second module configured to obtain one or more classifiers for classifying the component as a first condition or a second condition based on physics features; and a third module configured to: determine a health of the component based on the generated physics features of the first model and the one or more classifiers.

The system of any proceeding clause, wherein the one or more parameters are raw data for the component of the additive manufacturing device.

The system of any proceeding clause, wherein the component is a cathode, and the raw data includes a grid voltage and a beam current for the cathode.

The system of any proceeding clause, wherein the component is a cathode, and the physics features include at least one of a cathode temperature, a cathode brightness, and vacuum environment.

The system of any proceeding clause, wherein the one or more transfer functions is updated based on parameters related to wear and tear of the component of the additive manufacturing device.

The system of any proceeding clause, wherein the second module is configured to update the one or more classifiers based on parameters related to wear and tear of the component of the additive manufacturing device.

The system of any proceeding clause, wherein the one or more classifiers include threshold values determined based on machine learning or statistical models on evaluation of builds and parameters for the builds.

The system of any proceeding clause, further includes a fourth module configured to determine a cause for a failure of the component based on a comparison of the generated physics features of the first model and the one or more classifiers.

A method for diagnosing an additive manufacturing device includes obtaining one or more parameters for a digital twin of a component of an additive manufacturing device based on raw data from the component of the additive manufacturing device; generating physics features for the component of the additive manufacturing device based on the one or more parameters and one or more transfer functions; obtaining one or more classifiers for classifying the component as a first condition or a second condition based on physics features; and determining a health of the component based on the generated physics features for the component of the additive manufacturing device and the one or more classifiers.

The method of any proceeding clause, wherein the one or more parameters are raw data for the component of the additive manufacturing device.

The method of any proceeding clause, wherein the component is a cathode, and the raw data includes a grid voltage and a beam current for the cathode.

The method of any proceeding clause, wherein the component is a cathode, and the physics features include at least one of a cathode temperature, a cathode brightness, and vacuum environment.

The method of any proceeding clause, further includes updating the one or more transfer functions based on parameters related to wear and tear of the component of the additive manufacturing device.

The method of any proceeding clause, further includes updating the one or more classifiers based on parameters related to wear and tear of the component of the additive manufacturing device.

The method of any proceeding clause, wherein the one or more classifiers include threshold values determined based on machine learning or statistical models on evaluation of builds and parameters for the builds.

The method of any proceeding clause, further includes determining a cause for a failure of the component based on a comparison of the generated physics features of the first model and the one or more classifiers.

A non-transitory machine readable media includes computer executable instructions, when executed by one or more processors, configured to: obtain one or more parameters for a digital twin of a component of an additive manufacturing device based on raw data from the component of the additive manufacturing device; generate physics features for the component of the additive manufacturing device based on the one or more parameters and one or more transfer functions; obtain one or more classifiers for classifying the component as a first condition or a second condition based on physics features; and determine a health of the component based on the generated physics features for the component of the additive manufacturing device and the one or more classifiers.

The non-transitory machine readable media of any proceeding clause, wherein the one or more parameters are raw data for the component of the additive manufacturing device.

The non-transitory machine readable media of any proceeding clause, wherein the component is a cathode, and the raw data includes a grid voltage and a beam current for the cathode.

The non-transitory machine readable media of any proceeding clause, wherein the computer executable instructions, when executed by one or more processors, are configured to update the one or more transfer functions based on parameters related to wear and tear of the component of the additive manufacturing device.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to diagnose an additive manufacturing device, the apparatus comprising:

memory; and a processor, the processor to execute instructions stored in the memory to at least:

select at least one classifier based on physics features to be monitored for the additive manufacturing device, the at least one classifier formed from a model combined with at least one physics feature extracted from a first output of the additive manufacturing device;

determine a respective threshold for each physics feature, the threshold associated with the respective at least one classifier;

evaluate, using the at least one classifier and the respective threshold for each physics feature, data from operation of the additive manufacturing device to determine whether any respective threshold is exceeded;

classify operation of the additive manufacturing device based on the determination of whether any respective threshold is exceeded;

generate a second output based on the classification; and adjust the additive manufacturing device based on the second output.

2. The apparatus of claim 1, wherein the classification includes: a) normal operation of the additive manufacturing device, and b) at least one of an error or a failure of the additive manufacturing device.

3. The apparatus of claim 2, wherein the second output includes a root cause of the at least one of the error or the failure.

4. The apparatus of claim 3, wherein the root cause is determined by applying at least one of a trained machine learning model or a statistical model.

5. The apparatus of claim 3, wherein the second output includes a correction for the root cause.

6. The apparatus of claim 5, wherein the correction includes an adjustment of the additive manufacturing device.

7. The apparatus of claim 1, wherein the physics features are extracted from at least one physics-based model of the additive manufacturing device, and wherein the at least one classifier is included in a data science model.

8. The apparatus of claim 1, wherein the at least one classifier is updated based on an efficiency drop associated with wear and tear of the additive manufacturing device.

9. The apparatus of claim 1, wherein the classification is further based on a weighted average and a transfer function.

10. At least one non-transitory machine readable medium comprising instructions to cause at least one processor to at least:

select at least one classifier based on physics features to be monitored for an additive manufacturing device, the at least one classifier formed from a model combined with at least one physics feature extracted from a first output of the additive manufacturing device;

determine a respective threshold for each physics feature, the threshold associated with the respective at least one classifier;

evaluate, using the at least one classifier and the respective threshold for each physics feature, data from operation of the additive manufacturing device to determine whether any respective threshold is exceeded;

classify operation of the additive manufacturing device based on the determination of whether any respective threshold is exceeded;

generate a second output based on the classification, the second output to adjust at least one of the additive manufacturing device or the at least one classifier; and adjust the additive manufacturing device based on the second output.

11. The at least one non-transitory machine readable medium of claim 10, wherein the classification includes: a) normal operation of the additive manufacturing device, and b) at least one of an error or a failure of the additive manufacturing device.

12. The at least one non-transitory machine readable medium of claim 11, wherein the second output includes a root cause of the at least one of the error or the failure.

13. The at least one non-transitory machine readable medium of claim 12, wherein the root cause is determined by applying at least one of a trained machine learning model or a statistical model.

14. The at least one non-transitory machine readable medium of claim 12, wherein the second output includes a correction for the root cause.

15. The at least one non-transitory machine readable medium of claim 14, wherein the correction includes an adjustment of the additive manufacturing device.

16. The at least one non-transitory machine readable medium of claim 10, wherein the physics features are extracted from at least one physics-based model of the additive manufacturing device, and wherein the at least one classifier is included in a data science model.

17. The at least one non-transitory machine readable medium of claim 10, wherein the at least one classifier is updated based on an efficiency drop associated with wear and tear of the additive manufacturing device.

18. The at least one non-transitory machine readable medium of claim 10, wherein the classification is further based on a weighted average and a transfer function.

19. A method comprising:

selecting, by executing an instruction using processor circuitry, at least one classifier based on physics features to be monitored for an additive manufacturing device, the at least one classifier formed from a model combined with at least one physics feature extracted from a first output of the additive manufacturing device;

determining, by executing an instruction using processor circuitry, a respective threshold for each physics feature, the threshold associated with the respective at least one classifier;

evaluating, using the at least one classifier and the respective threshold for each physics feature, data from operation of the additive manufacturing device to determine whether any respective threshold is exceeded;

classifying, by executing an instruction using processor circuitry, operation of the additive manufacturing device based on the determination of whether any respective threshold is exceeded;

generating, by executing an instruction using processor circuitry, a second output based on the classification, the second output to adjust at least one of the additive manufacturing device or the at least one classifier; and adjusting the additive manufacturing device based on the second output.

20. The method of claim 19, further including correcting a root cause of an error using the second output.

* * * * *